United States Patent
Lee

(10) Patent No.: US 8,612,567 B2
(45) Date of Patent: Dec. 17, 2013

(54) APPARATUS FOR PROVIDING POLICY AND TERMINAL DEVICE FOR CHANGING NETWORK IN HETEROGENEOUS NETWORKS

(75) Inventor: Gyu Min Lee, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 13/640,668

(22) PCT Filed: Nov. 8, 2011

(86) PCT No.: PCT/KR2011/008442
§ 371 (c)(1),
(2), (4) Date: Dec. 5, 2012

(87) PCT Pub. No.: WO2012/064067
PCT Pub. Date: May 18, 2012

(65) Prior Publication Data
US 2013/0073710 A1    Mar. 21, 2013

(30) Foreign Application Priority Data

Nov. 10, 2010 (KR) .................. 10-2010-0111506
Nov. 11, 2010 (KR) .................. 10-2010-0112239
Nov. 15, 2010 (KR) .................. 10-2010-0113496

(51) Int. Cl.
*G06F 15/173* (2006.01)

(52) U.S. Cl.
USPC .......... 709/223; 709/224; 709/229; 455/419; 455/456.3

(58) Field of Classification Search
USPC ............ 709/223, 224, 229; 455/419, 456.3, 455/456.4
See application file for complete search history.

(56) References Cited

U.S. PATENT DOCUMENTS

| | | | |
|---|---|---|---|
| 7,263,353 B2* | 8/2007 | Forsberg et al. | 455/420 |
| 7,769,887 B1* | 8/2010 | Bhattacharyya et al. | 709/238 |
| 8,151,321 B2* | 4/2012 | Waris | 726/4 |
| 8,264,978 B1* | 9/2012 | Srinivas et al. | 370/252 |

(Continued)

FOREIGN PATENT DOCUMENTS

| | | |
|---|---|---|
| JP | 2008219733 A | 9/2008 |
| KR | 10-2008-0007290 | 1/2008 |

(Continued)

OTHER PUBLICATIONS

International Search Report mailed Apr. 27, 2012 for PCT/KR2011/008442.

(Continued)

*Primary Examiner* — Lashonda Jacobs
(74) *Attorney, Agent, or Firm* — Lowe Hauptman & Ham, LLP

(57) ABSTRACT

Disclosed is a policy providing apparatus and a terminal device supporting an network change in heterogeneous networks. The terminal device accesses one network among two or more networks and uses a data service, and the policy providing apparatus recognizes service status information of the data service for the terminal device, generates a network change policy for inducing the terminal device to change the access network based on the recognized service status information, and provides the network change policy to the terminal device. Then, the terminal device determines whether it is possible to access a particular network required to be accessed based on the network change policy, and tries to access the particular network through the multi communication unit and changes the access network when it is possible to access the particular network.

17 Claims, 18 Drawing Sheets

(56) References Cited

U.S. PATENT DOCUMENTS

| | | | | |
|---|---|---|---|---|
| 8,271,025 | B2* | 9/2012 | Brisebois et al. | 455/552.1 |
| 2007/0027980 | A1* | 2/2007 | Herrod et al. | 709/224 |
| 2008/0045262 | A1* | 2/2008 | Phan et al. | 455/525 |
| 2008/0159232 | A1* | 7/2008 | Thalanany et al. | 370/332 |
| 2009/0197597 | A1* | 8/2009 | Kotecha | 455/433 |
| 2009/0265752 | A1* | 10/2009 | Sharif-Ahmadi et al. | 726/1 |
| 2009/0325566 | A1* | 12/2009 | Bell et al. | 455/419 |
| 2012/0315889 | A1* | 12/2012 | Ionescu et al. | 455/422.1 |
| 2013/0078979 | A1* | 3/2013 | Bell et al. | 455/418 |
| 2013/0091537 | A1* | 4/2013 | Parla et al. | 726/1 |

FOREIGN PATENT DOCUMENTS

| | | |
|---|---|---|
| KR | 10-2009-0066115 | 6/2009 |
| KR | 10-2010-0030918 | 3/2010 |
| KR | 10-2010-0079093 | 7/2010 |
| WO | 2006061184 A1 | 6/2006 |
| WO | 2008096702 A1 | 8/2008 |

OTHER PUBLICATIONS

Japanese Office Action for application No. 2013-524808 issued Jun. 28, 2013.

* cited by examiner

APPARATUS FOR PROVIDING POLICY AND TERMINAL DEVICE FOR CHANGING NETWORK IN HETEROGENEOUS NETWORKS

CROSS REFERENCE TO RELATED APPLICATION

This application claims the priority of Korean Patent Application No. 10-2010 -0111506, filed on Nov. 10, 2010, Korean Patent Application No. 10-2010-0112239, filed on Nov. 11, 2010, and Korean Patent Application No. 10-2010-0113496, filed on Nov. 15, 2010 in the KIPO (Korean Intellectual Property Office). Further, this application is the National Phase application of International Application No. PCT/KR2011/008442 filed Nov. 8, 2011, which designates the United States and was published in Korean.

TECHNICAL FIELD

The present invention relates to a policy providing apparatus and a terminal device supporting network change in heterogeneous networks environments, and more particularly, to a system and a method for network change among heterogeneous networks, a terminal device, an operation method thereof, a policy providing apparatus, and an operation method thereof, in which a network operator is able to change a network accessed by the terminal device in a heterogeneous network environments, so that the network operator plays a leading role in effectively distributing data traffics and thereby guaranteeing the network stability.

BACKGROUND

Recently, it is common that communication service providers provide various services based on various wireless communication technologies. The service providers have provided services based on WLAN (ex. WiFi) related a short range wireless network, as well as the WCDMA, CDMA, and WiBro. Moreover, they positively employ a Long Term Evolution (LTE) technology.

In a heterogeneous networks environment including various networks mixed therein as described above, it is general scheme for providing data service with a terminal device such that the terminal device selects access network for data service among heterogeneous networks.

Therefore it can be said that the conventional scheme is not preferable for the service provider because the service provider has limitation on the controllability of the selection of access network.

Meanwhile, these days, various wireless devices, such as a smart phone and a tablet PC, has been developed. In addition, a charge for data service decreased, and simultaneously data service using a large amount of data traffic increased. In such circumstances, the load on the networks of the service providers rapidly increases, thereby requiring excessive expense for network investment and threatening the service stability.

Accordingly, there is a need for a new service scheme for actively selecting an access network in a heterogeneous network environment according to the network state and achieving an efficient data transmission using the selected network.

SUMMARY

Accordingly, the present invention has considered the above-mentioned background, and an aspect of the present invention seeks to provide a policy providing apparatus and an operation method of the policy providing apparatus, which recognize service status information of a data service which is used by a terminal device through one network among two or more networks, generate a network change policy for changing the one network accessed by the terminal device based on the service status information, and provide the terminal device with the network change policy, so that a network operator can play a leading role in changing the network accessed by the terminal device in a heterogeneous network environment.

Also, the present invention has considered the above-mentioned background, and another aspect of the present invention seeks to provide a terminal device and an operation method of the terminal device, which access one network among two or more networks, determine, when a network change policy is received, whether it is possible to access particular network required to be accessed based on the network change policy; and access the particular network when it is possible to access the particular network, thereby changing a current access network into the particular network, so that a network operator can play a leading role in changing the network accessed by the terminal device in a heterogeneous network environment.

Technical Solution

In accordance with an aspect of the present invention, there is provided a policy providing apparatus, comprising: a device control unit configured to recognize service status information of a data service which is used by a terminal device through one network among two or more networks, generate a network change policy for changing the one network accessed by the terminal device based on the service status information, and provide the terminal device with the network change policy.

The service status information may comprise at least one of load state information of a wireless access node corresponding to the one network accessed by the terminal device, type information of an application executed in the terminal device, or network-specific performance information for each of the two or more networks.

The device control unit may be configured to acquire load state information of wireless access node corresponding to each of the two or more networks, determine certain wireless access node having load state information corresponding to a particular change criteria based on the load state information of wireless access node corresponding to each of the two or more networks, and recognize at least one terminal device accessing the certain wireless access node.

The device control unit may be configured to generate a network change policy based on the load state information of the certain wireless access node, and provide the network change policy to the at least one terminal device.

The device control unit is configured to recognize the type information of the application executed in the terminal device, and the type information of the application may be detected by the terminal device or a detection device for detecting the type information of the application.

The device control unit is configured to generate a network change policy based on the recognized type information of the application, and provide the network change policy to the terminal device.

The device control unit may be configured to recognize network-specific performance information with respect to the terminal device, and the network-specific performance information may be detected by a performance detection device based on transmission or reception of a test packet through each of the two or more networks with respect to the terminal device.

The device control unit may be configured to generate a network change policy based on the recognized network-specific performance information, and provide the network change policy to the terminal device.

In accordance with an aspect of the present invention, there is provided a terminal device, comprising: a multi communication unit configured to support two or more networks; an access control unit configured to, when a network change policy is received, determine whether it is possible to access particular network required to be accessed based on the network change policy, and access the particular network through the multi communication unit when it is possible to access the particular network, thereby changing current access network into the particular network.

The terminal device may further comprise a testing unit configured to transmit or receive a test packet through the two or more networks for detecting performance information of each of the two or more networks.

In accordance with an aspect of the present invention, there is provided an operation method of a policy providing apparatus, comprising: recognizing service status information of a data service which is used by a terminal device through one network among two or more networks; and generating a network change policy for changing the one network accessed by the terminal device based on the service status information, and providing the terminal device with the network change policy.

The service status information may comprise at least one of load state information of a wireless access node corresponding to the one network accessed by the terminal device, type information of an application executed in the terminal device, or network-specific performance information for each of the two or more networks.

The step of recognizing the service status information may comprise acquiring load state information of wireless access node corresponding to each of the two or more networks; determining certain wireless access node having load state information corresponding to a particular change criteria based on the load state information of wireless access node corresponding to each of the two or more networks; and recognizing at least one terminal device accessing the certain wireless access node.

The step of providing the network change policy may comprise generating a network change policy based on the load state information of the certain wireless access node; and providing the network change policy to the at least one terminal device.

The step of recognizing the service status information may comprise recognizing the type information of the application executed in the terminal device, and the type information of the application may be detected by the terminal device or a detection device for detecting the type information of the application.

The step of providing the network change policy may comprise generating a network change policy based on the recognized type information of the application; and providing the network change policy to the terminal device.

The step of recognizing the service status information may comprise recognizing network-specific performance information with respect to the terminal device, and the network-specific performance information may be detected by a performance detection device based on transmission or reception of a test packet through each of the two or more networks with respect to the terminal device.

The step of providing the network change policy may comprise generating a network change policy based on the recognized type information of the application; and providing the network change policy to the terminal device.

In accordance with an aspect of the present invention, there is provided an operation method of a terminal device, comprising: accessing one network among two or more networks; determining, when a network change policy is received, whether it is possible to access particular network required to be accessed based on the network change policy; accessing the particular network when it is possible to access the particular network, thereby changing a current access network into the particular network.

The operation method of a terminal device may further comprise transmitting or receiving a test packet through the two or more networks for detecting performance information of each of the two or more networks;

Advantageous Effects

In accordance with a policy providing apparatus and a terminal device for supporting network change in heterogeneous networks environments, a network change policy determined based on a load state of a wireless access node such as an access point (AP), a type of an application executed in the terminal device, a performance of each network, etc. is provided with the terminal device, so as to induce the terminal device to change network which the terminal device is accessing. Therefore, a network operator is able to play a leading role in effectively distributing data traffics and thereby guaranteeing the network stability.

DETAILED DESCRIPTION OF THE EXEMPLARY EMBODIMENTS

A system for network change in heterogeneous networks according to an exemplary embodiment of the present invention includes: a terminal device for accessing one network among two or more networks and using a data service through the accessed network; and a policy providing apparatus for recognizing service status information of the terminal device according to the data service, generating a network change policy for inducing an network change into a particular network in accordance with the recognized service status information, and providing the generated network change policy to the terminal device.

In response, upon receiving the network change policy from the policy providing apparatus, the terminal device determines, based on the received network change policy, whether it is possible to access a particular network which the terminal device desires to access. Then, when it is possible to access the particular network, the terminal device tries to access the particular network and then changes the accessing network into the particular network.

Hereinafter, exemplary embodiments of the present invention will be described with reference to the accompanying drawings.

Figure 1:
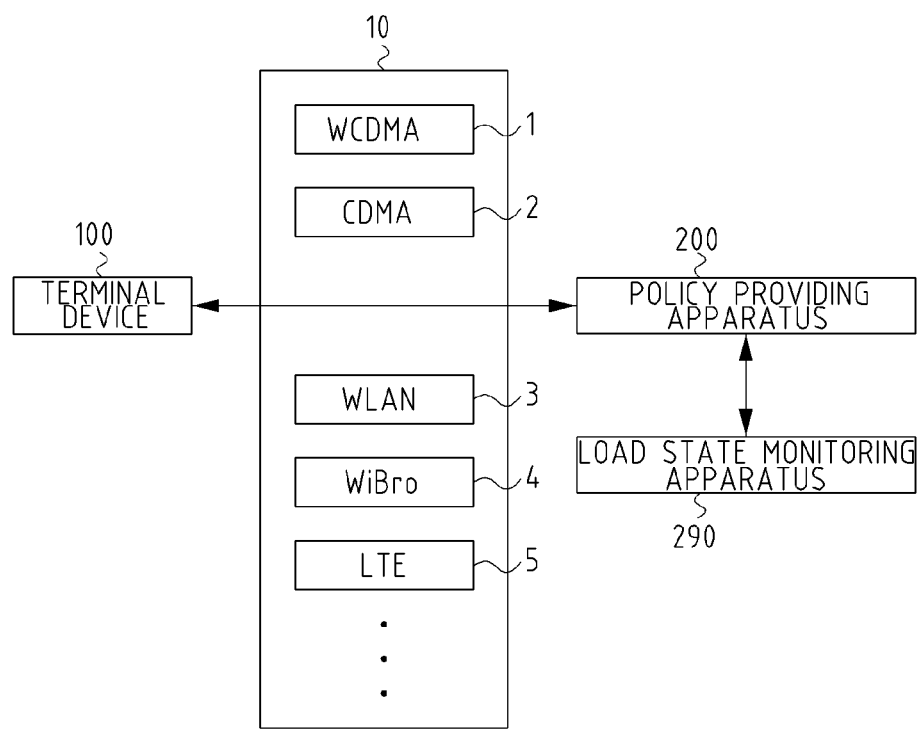
FIG. 1 is a block diagram illustrating a system for network change in heterogeneous networks according to the first exemplary embodiment of the present invention.
Figure 2:
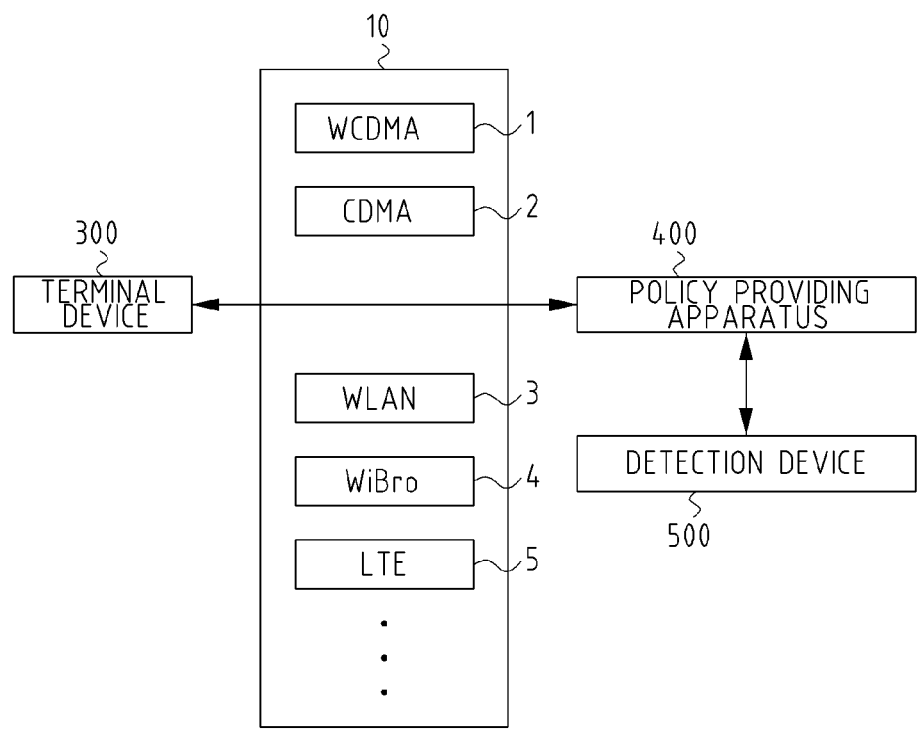
FIG. 2 is a block diagram illustrating a system for network change in heterogeneous networks according to the second exemplary embodiment of the present invention.
Figure 3:
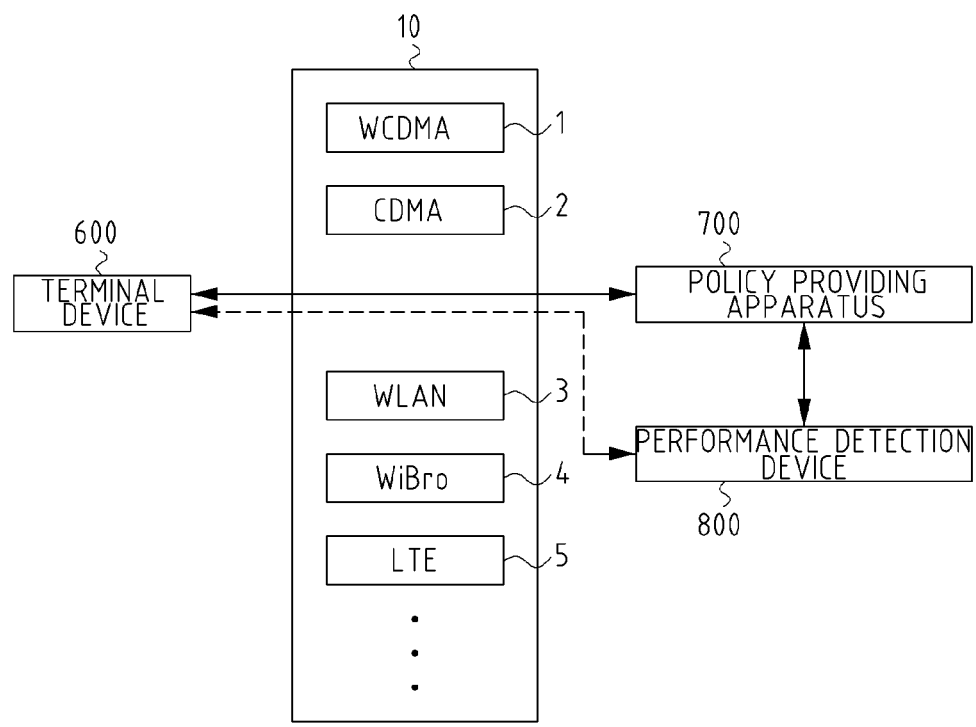
FIG. 3 is a block diagram illustrating a system for network change in heterogeneous networks according to the third exemplary embodiment of the present invention.

As shown in FIGS. 1, 2, and 3, a system for network change in heterogeneous networks according to the present invention includes: terminal devices 100, 300, and 600 for accessing one network (for example, a WCDMA network) among two or more networks 10 and using a data service through the network; and policy providing apparatuses 200, 400, and 700 for recognizing service status information of the terminal devices 100, 300, and 600 according to the data service, generating a network change policy for inducing an network change into a particular network (for example, a WLAN network) corresponding to the recognized service status information, and providing the generated network change policy to the terminal devices 100, 300, and 600.

The terminal devices 100, 300, and 600 correspond to terminals supporting a communication for two or more networks 10 including various types of networks.

The two or more networks or heterogeneous networks 10 refer to all or some wireless networks which a terminal device can access through interworking between networks possessed by a plurality of service providers or each service provider, and may correspond to an environment in which a WCDMA network 1, a CDMA network 2, a WLAN network 3 (for example, a WiFi network), a WiBro network 4, and an LTE network 5 interwork with each other.

Upon receiving a network change policy from a policy providing apparatus 200, the terminal devices 100, 300, and 600 determine whether it is possible to access a particular network (for example, a WLAN). When it is possible to access the particular network, the terminal devices 100, 300, and 600 try to access the particular network.

Then, the terminal devices 100, 300, and 600 may change the accessing network from the WCDMA network 1 to the WLAN network 3.

Here, the service status information may include at least one item among load state information of a wireless access node corresponding to the network which a terminal device is accessing, type information of an application executed in a terminal device, and network-specific performance information for each of two or more networks.

That is, in using a data service through the two or more networks 10 by the terminal device 100, the service status information may be information on the load state of the networks, the application type of the data service used by the terminal device 100, and network-specific performance corresponding to the terminal device 100.

First, a case in which the service status information is load state information of a wireless access node corresponding to the network which the terminal device is accessing is described as a first embodiment of the present invention with reference to FIG. 1.

Each network included in the two or more networks 10 has wireless access nodes belonging to itself. For example, the WCDMA network 1 has base station apparatuses belonging to itself and the WLAN network 3 has access points (APs) belonging to itself.

The terminal device 100 may access one network among the two or more networks 10 and then use a data service through the network. For example, the terminal device 100 may use a data service through a wireless access node, i.e. a base station apparatus, of the WCDMA network 1.

The policy providing apparatus 200 monitors the load state of a wireless access node of each network included in the two or more networks 10 and determines whether there is a wireless access node having a load state corresponding to a pre-established change criteria. As a result of the determination, when a load state of a particular wireless access node corresponds to the pre-established change criteria, the policy providing apparatus 200 generates a network change policy corresponding to the load state of the particular wireless access node and provides the network change policy to a terminal device 100 connected to the particular wireless access node.

Specifically, the policy providing apparatus 200 acquires load state information of wireless access node including monitored load states of wireless access nodes corresponding to the two or more networks 10, respectively.

For example, a system for network change in heterogeneous networks according to an exemplary embodiment of the present invention may further include a load state monitoring apparatus 290.

For each network included in the two or more networks 10, the load state monitoring apparatus 290 generates load state information of wireless access node including monitored load state information of at least one wireless access node belonging to the network and provides the generated load state information of wireless access node to the policy providing apparatus 200.

In other words, the load state monitoring apparatus 290 may continuously monitor the load state of base station apparatuses belonging to the WCDMA network 1, and then provide load-related information including monitored load state information and apparatus information (for example, a base station ID, location information, etc.) of the base station apparatuses to the policy providing apparatus 200 at a particular time. Further, the load state monitoring apparatus 290 may continuously monitor the load state of access points (APs) belonging to the WLAN 3, and then provide load-related information including monitored load state information and apparatus information (for example, an AP ID, location information, etc.) of the APs to the policy providing apparatus 200 at a particular time.

As described above, the load state monitoring apparatus 290 may provide load-related information of each network, that is, load state information of wireless access node of each network, to the policy providing apparatus 200.

Meanwhile, a system for network change in heterogeneous networks according to the first embodiment of the present invention may not include a separately configured load state monitoring apparatus 290 as described above. In this case, the policy providing apparatus 200 may perform the monitoring function of the load state monitoring apparatus 290 as described above by itself and may generate load state information of wireless access node according to the monitoring by itself.

Based on load state information of wireless access node, the policy providing apparatus 200 searches for a wireless access node having load state information corresponding to a particular change criteria.

When a wireless access node having load state information corresponding to a particular change criteria is found, the policy providing apparatus 200 recognizes at least one terminal device 100 accessing the found wireless access node (for example, a base station apparatus of a WCDMA network 1).

Simultaneously, based on load-based policy configuration predefined in order to induce network change into a particular network based on the load state, the policy providing apparatus 200 generates a network change policy according to the load state information of the found wireless access node (for example, a base station apparatus of a WCDMA network 1).

Further, the policy providing apparatus 200 may provide the generated network change policy to the recognized at least one terminal device 100.

In providing the generated network change policy to the corresponding terminal device 100, it is recommendable that the network change policy provided by the policy providing apparatus 200 follows the Access Network Discovery and Selection Function (ANDSF) or MIH (Media Independent Handover) standards.

Upon receiving the network change policy from outside, especially from the policy providing apparatus 200, the terminal device 100 determines whether it is possible to access a particular network (for example, a WLAN 3) which is a target of a network change according to the received network change policy, and then changes the access network from the WCDMA network 1, which the terminal device 100 is currently accessing, to the WLAN 3 when it is possible to access the WLAN 3.

Next, a case in which the service status information is type information of an application executed in a terminal device will be described as a second embodiment of the present invention with reference to FIG. 2.

The terminal device 300 may access one network among the two or more networks 10 and use a data service through the network. For example, the terminal device 300 may use a data service through a wireless access node, i.e. a base station apparatus, of the WCDMA network 1.

The terminal device 300 may recognize an application executed in the terminal device 300 itself corresponding to the currently used data service or determine the type of the application by analyzing data traffic of the data service by itself and then provide a result of the determined application type to the policy providing apparatus 400.

The policy providing apparatus 400 recognizes a type of an application executed in the terminal device 300, generates a network change policy according to the recognized type of the application, and then provides the generated network change policy to the terminal device 100.

In more detail, based on a result of determining a type of an application executed in the terminal device 300 provided by a particular detection device 500 or a result of the determination on the application types, which is provided by the terminal device 300, the policy providing apparatus 400 recognizes the type information of an application executed in the terminal device 300.

Specifically, the detection device 500 corresponds to the terminal device 300 which accesses one network (for example, a WCDMA network 1) among the two or more networks and uses a data service through the network, and the terminal device 300 may determine the type of the application executed in the terminal device 300.

In this event, the detection device 500 may access the two or more networks 10, analyze data traffic of all terminal devices using the data service either continuously or with a particular analysis cycle, and provide a result of the analysis to the policy providing apparatus 400. Otherwise, the detection device 500 may analyze data traffic of a particular terminal device, which starts to use the data service or will perform a handover, and provide a result of the analysis to the policy providing apparatus 400.

The detection device 500 as described above either may be a component included in or provided at a gateway device (for example, a packet data network gateway) or may be arranged separately from a gateway device.

Based on application-based policy configuration predefined in order to induce network change into a particular network in accordance with the application type, the policy providing apparatus 200 may generate a network change policy according to the recognized application type information and provide the generated network change policy to the terminal device 300.

Upon receiving the network change policy from outside, especially from the policy providing apparatus 400, the terminal device 300 determines whether it is possible to access a particular network (for example, a WLAN 3) which is a target of a network change according to the received network change policy, and then changes the access network from the WCDMA network 1, which the terminal device 300 is currently accessing, to the WLAN 3 when it is possible to access the WLAN 3.

Next, a case in which the service status information is network-specific performance information of each of two or more networks corresponding to a terminal device will be described as a third embodiment of the present invention with reference to FIG. 3.

The terminal device 600 may access one network among the two or more networks 10 and use a data service through the network. For example, the terminal device 600 may use a data service through a wireless access node, i.e. a base station apparatus, of the WCDMA network 1.

The terminal device 600 may transmit or receive a predefined test packet to or from an outside particular apparatus, specifically a performance detection device 800, so as to support generation of network-specific performance information performed by the performance detection device 800.

The performance detection device 800 transmits or receives a predefined test packet through each network belonging to the two or more networks 10. Further, based on predefined performance standard information and a result of the transmission or reception of the test packet through each network, the performance detection device 800 generates network-specific performance information generated in accordance with the terminal device 600 to a policy providing apparatus 700.

Hereinafter, the performance detection device 800 will be described in more detail. The performance detection device 800 includes a test execution unit (not shown) for transmitting or receiving a predefined test packet through each network included in the two or more networks 10 to or from the terminal device 600.

Further, the performance detection device 800 includes a performance information providing unit (not shown) for generating performance information of each network based on predefined performance standard information and a result of the transmission or reception of the test packet through each network and providing the generated network-specific performance information corresponding to the terminal device 600 to the policy providing apparatus 700.

The test execution unit (not shown) transmits or receives a predefined test packet through each network included in the two or more networks 10 to or from the terminal device 600.

For example, the test execution unit (not shown) may generate a test packet having a predefined particular size corresponding to the terminal device 600 arriving at a particular detection time point, transmit the generated test packet to the terminal device 600 according to a predefined transmission pattern, and receive a response corresponding to the transmitted test packet.

That is to say, the test execution unit (not shown) may determine a terminal device 600 arriving at a particular detection time point as a terminal device which is a target of network change and transmit a test packet having a predefined particular size corresponding to the terminal device 600 through each network belonging to the two or more networks 10 according to a particular transmission pattern, so as to send a request for generation of performance information to the terminal device 600. Correspondingly, the test execution unit (not shown) may receive a response, i.e. a test packet, having a predefined size and/or according to a predefined transmission pattern from the terminal device 600 through each network.

Otherwise, the test execution unit (not shown) may determine a terminal device 600 arriving at a particular detection time point as a terminal device which is a target of network change, makes a request for execution of a test for generation of performance information to the terminal device 600, and receive a test packet having a predefined size according to a predefined transmission pattern from the terminal device 600 through each network belonging to the two or more networks 10.

Otherwise, at a particular test time point, the test execution unit (not shown) may receive a test packet having a predefined size according to a predefined transmission pattern through each network belonging to the two or more networks 10 from the terminal device 600 which spontaneously transmits the test packet.

The particular test time point may correspond to a time point at which the terminal device 600 accesses a particular network (for example, a WCDMA network 1) within the two or more networks 10 and starts to use a data service through the network, time points with a particular detection cycle during the use of the data service, or a time point at which a handover is to be performed due to occurrence of a predefined handover performance situation.

Based on the predefined performance standard information, the performance information providing unit (not shown) generates performance information of each network according to a result of the transmission or reception of the test packet through each network.

That is, the performance information providing unit (not shown) stores predefined performance reference information in order to determine the performance according to at least one of a packet delay rate, a maximum throughput, a minimum throughput, an average throughput, and a packet loss rate corresponding to each network belonging to the two or more networks 10.

In other words, the predefined performance reference information may refer to information including a packet delay rate, a maximum throughput, a minimum throughput, an average throughput, and a packet loss rate, as a reference for generation of performance information for a process of transmitting or receiving a test packet through a corresponding network, corresponding to each network belonging to the two or more networks 10.

Further, the performance information providing unit (not shown) may generate network-specific performance information corresponding to a terminal device 600 by reflecting a result of the transmission or reception of the test packet through each network corresponding to the terminal device 600 performed by the test execution unit (not shown) in the already stored predefined performance reference information.

That is, the performance information providing unit (not shown) may generate network-specific performance information corresponding to a terminal device 600 by reflecting a result (at least one of a packet delay rate, a maximum throughput, a minimum throughput, an average throughput, and a packet loss rate) of the transmission or reception of the test packet through each network corresponding to the terminal device 600 in the predefined performance reference information.

Further, the performance information providing unit (not shown) provides the generated network-specific performance information corresponding to the terminal device 600 to the policy providing apparatus 700.

The policy providing apparatus 700 recognizes performance information of each network belonging to the two or more networks 10 corresponding to the terminal device 600, generates a network change policy for inducing an network change into a particular network based on the recognized network-specific performance information, and provides the generated network change policy to the terminal device 600.

In more detail, the policy providing apparatus 700 recognizes network-specific performance information corresponding to each terminal device 600 through interworking with the performance detection device 800.

Further, based on performance-based policy configuration predefined in order to induce network change into a particular network in accordance with the network-specific performance information, the policy providing apparatus 700 may generate a network change policy according to the recognized network-specific performance information corresponding to the terminal device 600 and provide the generated network change policy to the terminal device 600.

Upon receiving the network change policy from outside, especially from the policy providing apparatus 700, the terminal device 600 determines whether it is possible to access a particular network (for example, a WLAN 3) which is a target of a network change according to the received network change policy, and then changes the access network from the WCDMA network 1, which the terminal device 600 is currently accessing, to the WLAN 3 when it is possible to access the WLAN 3.

Figure 4:
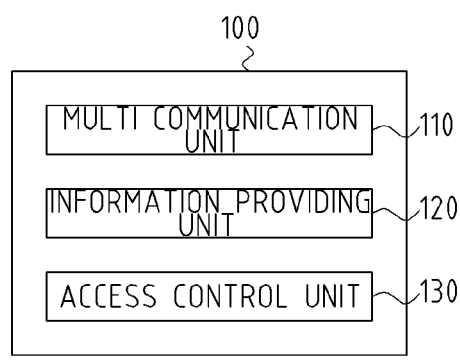
FIG. 4 is a block diagram illustrating a policy providing apparatus according to the first exemplary embodiment of the present invention.

Hereinafter, a construction of the terminal device 100 according to the first embodiment of the present invention as described above will be described with reference to FIG. 4.

The terminal device 100 according to the first embodiment of the present invention includes: a multi communication unit 110 supporting a communication for two or more networks 10; and an access control unit 130 for, when a particular network change policy is received, determining whether it is possible to access a particular network required to be accessed based on the network change policy, and trying to access the particular network through the multi communication unit 110 and changing a current access network into the particular network when it is possible to access the particular network.

The multi communication unit 110 supports multiple communications for the two or more networks 10 including various types of networks.

That is, the multi communication unit 110 may include a plurality of communication modules including: a first communication module supporting an access to a WCDMA network and use of a communication service through the WCDMA network 1; a second communication module supporting an access to a CDMA network 2 and use of a communication service through the CDMA network 2; a third communication module supporting an access to a WLAN 3 and use of a communication service through the WLAN 3; a fourth communication module supporting an access to a WiBro network and use of a communication service through the WiBro network 4; and a fifth communication module supporting an access to an LTE network 5 and use of a communication service through the LTE network 5.

Also, the terminal device 100 according to the first embodiment of the present invention may further include an information providing unit 120.

The information providing unit 120 may provide apparatus-related information, which includes at least one item among information of a wireless access node of a network which the terminal device 100 is accessing through the multi communication unit 110 and information of a wireless access node of a neighboring network, to the policy providing apparatus 200.

For example, the terminal device 100 may access a network (for example, the WCDMA network 1) by connecting to a base station apparatus within the WCDMA network 1 through the multi communication unit 110 and then use a data service through the WCDMA network 1.

When the terminal device 100 has been connected to the network as described above, the information providing unit 120 may provide apparatus-related information, which includes at least one item among information (for example, information of a base station apparatus of a WCDMA network 1) of a wireless access node of a network which the terminal device 100 is accessing and information (for example, an identifier (ID) or location information of an access point (AP) belonging to a WLAN 3 and located adjacently to the terminal device 100) of a wireless access node of a neighboring network, to the policy providing apparatus 200.

When a network change policy has been received from the policy providing apparatus 200, the access control unit 130 may perform a network change procedure for changing a network accessed by the multi communication unit 110 based on the network change policy received from the policy providing apparatus 200.

Specifically, the access control unit 130 may determine whether it is possible to access a particular network which is a target network of the network change based on the network change policy received from the policy providing apparatus 200, and try to access the particular network through the multi communication unit 110 when it is possible to access the particular network.

That is, when a network change policy has been received from the policy providing apparatus 200, the access control unit 130 recognizes a particular network (for example, a WLAN 3) which is a target network of the network change based on the network change policy received from the policy providing apparatus 200. Further, the access control unit 130 determine whether it is possible to access the particular network (for example, a WLAN 3) which is a target network of the network change, by activating the function of the multi communication unit 110 for making an access to and providing a communication service to the WLAN 3, i.e. by activating the function of the third communication module as described above.

In this event, the network change policy may include heterogeneous network change allowance or limit information, optimum network type information, optimum network selection and change priority information.

When it is determined that it is possible to access the particular network (for example, a WLAN 3), the access control unit 130 tries to access the particular network (for example, a WLAN 3) through the multi communication unit 110 and then interrupts the connection with the currently connected network (for example, the WCDMA network 1), so as to perform an access network change procedure according to the received network change policy.

Of course, when it is determined that it is impossible to access the particular network (for example, a WLAN 3), the access control unit 130 may not perform the access network change procedure according to the received network change policy.

In this event, the access network change procedure may include all or a part of a conventional handover procedure which changes the access from a currently connected network to another network. Since this access network change procedure corresponds to a typical procedure performed based on a policy in a conventional terminal device supporting a handover in heterogeneous networks.

Further, the access control unit 130 may provide a result of the access network change according to the network change policy to the policy providing apparatus 200.

For example, when the access control unit 130 has performed the access network change from a currently connected network (for example, a WCDMA network 1) to another particular network (for example, a WLAN 3) according to the network change policy, the access control unit 130 may provide a corresponding result of the access network change to the policy providing apparatus 200.

Further, when the access control unit 130 does not perform the access network change based on a determination that it is impossible to access another particular network (for example, a WLAN 3) as described above or due to an error occurred during the access network change, the access control unit 130 may provide a corresponding result to the policy providing apparatus 200.

Figure 5:
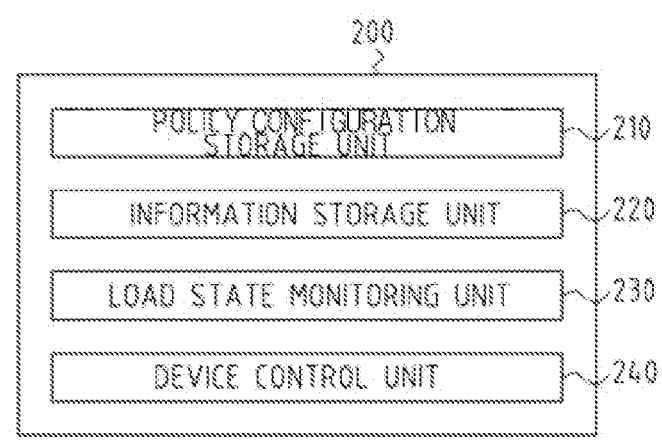
FIG. 5 is a block diagram illustrating a terminal device according to the first exemplary embodiment of the present invention.

Hereinafter, a construction of the policy providing apparatus 200 according to the first embodiment of the present invention as described above will be described with reference to FIG. 5.

The policy providing apparatus 200 according to the first embodiment of the present invention includes an device control unit 240 for recognizing service status information of a data service used by a terminal device 100, which accesses one network among two or more networks 10 and uses a data service through the network, generating a network change policy for inducing an network change into a particular network corresponding to the recognized service status information, and providing the generated network change policy to the terminal device 100.

The policy providing apparatus 200 according to the first embodiment of the present invention may further include a policy configuration storage unit 210 and an information storage unit 220.

The policy configuration storage unit 210 may store load-based policy configuration, which includes various network change policies predefined in order to induce an network change into an optimum network based on a load state of a network which the terminal device 100 is currently accessing in an environment of the two or more networks 10 and policy determination information based on which a particular network change policy is generated/determined among the various network change policies.

The device control unit 240 accesses one network among the two or more networks 10 and recognizes service status information according to a data service for the terminal device 100 using the data service.

According to the first embodiment of the present invention, the service status information includes load state information of a wireless access node corresponding to a network which the terminal device 100 is accessing.

The device control unit 240 monitors the load state of a wireless access node of each network included in the two or more networks 10 and determines whether there is a wireless access node having a load state corresponding to a pre-established change criteria. As a result of the determination, when a load state of a particular wireless access node corresponds to the pre-established change criteria, the device control unit 240 generates a network change policy corresponding to the load state of the particular wireless access node and provides the network change policy to a terminal device 100 connected to the particular wireless access node.

Specifically, the device control unit 240 acquires load state information of wireless access node including monitored load states of wireless access nodes corresponding to the two or more networks 10, respectively.

For example, through interworking with a separately constructed load state monitoring apparatus 290 as shown in FIG. 1, the device control unit 240 may acquire load state information of wireless access node from the load state monitoring apparatus 290.

Meanwhile, the policy providing apparatus 200 according to the first embodiment of the present invention may further include a load state monitoring unit 230.

The load state monitoring unit 230 may generate load state information of wireless access node including monitored load state information of at least one wireless access node belonging to each network included in the two or more networks 10, and provide the generated load state information of wireless access node to the device control unit 240.

In other words, the load state monitoring unit 230 continuously monitors the load state of a wireless access node belonging to each network included in the two or more networks 10. Then, the load state monitoring unit 230 provides load-related information including monitored load state information and apparatus information (for example, a base station ID, location information, etc.) of the wireless access node, so as to provide load-related information of each network, that is, load state information of wireless access node of each network, to the device control unit 240.

As a result, based on the load state information of wireless access node acquired from the load state monitoring apparatus 290 or the load state monitoring unit 230, the device control unit 240 may monitor the load state of a wireless access node of each network and determine whether there is a wireless access node having a load state corresponding to a pre-established particular change criteria.

In this event, it is recommendable that the device control unit 240 has a pre-established change criteria for each network. For example, the device control unit 240 may classify the load state of the WCDMA network 1 into states of high, middle, and low and predefine the "high" state as a state requiring the change, and may classify the load state of the WLAN 3 into states of high and low and predefine the "high" state as a state requiring the change.

When a wireless access node having load state information corresponding to the pre-established particular change criteria is found, the device control unit 240 recognizes at least one terminal device 100 accessing the found wireless access node (for example, a base station apparatus of a WCDMA network 1).

In more detail, the information storage unit 220 stores the apparatus-related information provided from each terminal device.

That is, the information storage unit 220 stores/manages apparatus-related information provided by at least one terminal device 100, which includes at least one item among information of a wireless access node of a network which the terminal device 100 is accessing and information of a wireless access node of a neighboring network.

As a result, for each terminal device 100, the policy providing apparatus 200 can manage the apparatus-related information, which includes at least one item among information (for example, base station ID, location information, etc. of a base station apparatus of a WCDMA network 1) of a wireless access node of a network which the terminal device 100 is currently accessing and information (for example, an AP ID, location information, etc. of an AP of a WLAN 3) of a wireless access node of a neighboring network.

Therefore, when a wireless access node having load state information corresponding to the pre-established particular change criteria is found, the device control unit 240 recognizes at least one terminal device 100 accessing the found wireless access node (for example, a base station apparatus of a WCDMA network 1) based on the apparatus-related information.

Simultaneously, based on the load-based policy configuration predefined in order to induce network change into a particular network based on a load state, the device control unit 240 generates a network change policy according to the load state information of the found wireless access node (for example, a base station apparatus of a WCDMA network 1).

For example, when the load state of a particular base station apparatus belonging to the WCDMA network 1 corresponds to the pre-established particular change criteria (for example, high state), the device control unit 240 determines a particular network (for example, a WLAN 3) to be accessed based on a load-based policy configuration reflecting the load state of the particular base station apparatus and generates/determines a network change policy for inducing a terminal device to change its access network.

Further, the device control unit 240 may provide the generated network change policy to the recognized at least one terminal device 100.

Based on the network change policy received from the policy providing apparatus 200, when it is possible to access a particular network (for example, a WLAN 3) which is a target of a network change, the terminal device 100 may change the access network from the current WCDMA network 1 to the WLAN 3.

Figure 6:
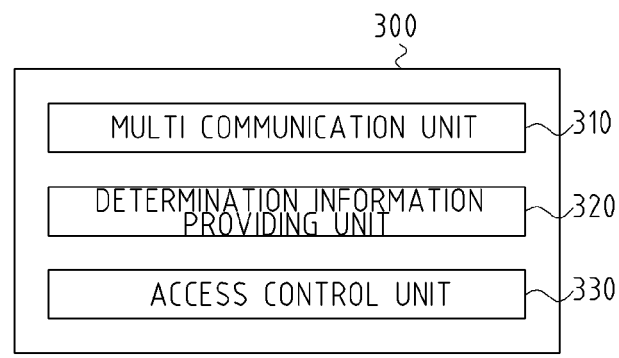
FIG. 6 is a block diagram illustrating a policy providing apparatus according to the second exemplary embodiment of the present invention.

Hereinafter, a construction of the terminal device 300 according to the second embodiment of the present invention as described above will be described with reference to FIG. 6.

The terminal device 300 according to the second embodiment of the present invention includes: a multi communication unit 310 supporting a communication for two or more networks 10; and an access control unit 330 for, when a particular network change policy is received, determining whether it is possible to access a particular network required to be accessed based on the network change policy, and trying to access the particular network through the multi communication unit 310 and changing a current access network into the particular network when it is possible to access the particular network.

The multi communication unit 310 corresponds to the multi communication unit 110 according to the first embodiment of the present invention, so a detailed description thereof is omitted here.

The terminal device 300 according to the second embodiment of the present invention may further include a determination information providing unit 320.

At a particular provision time point while the terminal device 300 is accessing a particular network (for example, a WCDMA network 1) within the two or more networks 10 through the multi communication unit 310 and is using a data service through the particular network, the determination information providing unit 320 may recognize an application executed in the terminal device 300 corresponding to the currently used data service or determine the type of the application by analyzing data traffic of the data service by itself and then provide a result of the determined application type to the policy providing apparatus 400.

That is, at a particular provision time point while the terminal device 300 is accessing a particular network (for example, a WCDMA network 1) within the two or more networks 10 through the multi communication unit 310 and is using a data service through the particular network, the determination information providing unit 320 may provide an application type determination result indicating the type of an application being executed to the policy providing apparatus 400. Alternatively, at the particular provision time point, the determination information providing unit 320 may analyze data traffic transmitted through the multi communication unit 310 and provide an application type determination result indicating the type of an application being executed to the policy providing apparatus 400 based on a result of the analysis.

Here, the particular provision time point may correspond to a time point at which the terminal device 300 accesses a particular network (for example, a WCDMA network 1) within the two or more networks 10 and starts to use a data service through the network, time points with a particular detection cycle during the use of the data service, or a time point at which a handover is to be performed due to occurrence of a predefined handover performance situation.

As a result, the policy providing apparatus 400 receives application type determination results indicating a type of an application being executed from various terminal devices including the terminal device 300 as described above.

When a network change policy has been received from the policy providing apparatus 400, the access control unit 330 may perform a network change procedure for changing a network accessed by the multi communication unit 310 based on the network change policy received from the policy providing apparatus 200.

The network change procedure performed based on the network change policy by the access control unit 330 corresponds to the operation of the access control unit 130 according to the first embodiment of the present invention, so a detailed description thereof is omitted here.

In this event, the network change policy received from the policy providing apparatus 400 may include heterogeneous network change allowance or limit information, optimum network type information, optimum network selection and change priority information.

Further, the access control unit 330 may provide a result of the access network change according to the network change policy to the policy providing apparatus 400.

Further, when the access control unit 330 does not perform the access network change based on a determination that it is impossible to access another particular network (for example, a WLAN 3) as described above or due to an error occurred during the access network change, the access control unit 330 may provide a corresponding result to the policy providing apparatus 200.

Figure 7:
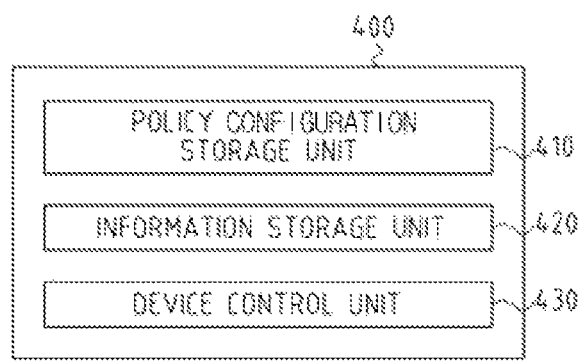
FIG. 7 is a block diagram illustrating a terminal device according to the second exemplary embodiment of the present invention.

Hereinafter, a construction of the policy providing apparatus 400 according to the second embodiment of the present invention as described above will be described with reference to FIG. 7.

The policy providing apparatus 400 according to the second embodiment of the present invention includes an device control unit 430 for recognizing service status information of a data service used by a terminal device 300, which accesses one network among two or more networks 10 and uses the data service through the network, generating a network change policy for inducing an network change into a particular network corresponding to the recognized service status information, and providing the generated network change policy to the terminal device 300.

The policy providing apparatus 400 according to the second embodiment of the present invention may further include a policy configuration storage unit 410 and an information storage unit 420.

The policy configuration storage unit 410 may store application-based policy configuration, which includes various network change policies predefined in order to induce an network change into an optimum network based on the application type of a currently executed application in an environment of the two or more networks 10 and policy determination information based on which a particular network change policy is generated/determined among the various network change policies.

Also, the policy providing apparatus 400 according to the second embodiment of the present invention may further include an information storage unit 420.

The information storage unit 420 stores the apparatus-related information provided from each terminal device.

That is, the information storage unit 420 stores/manages apparatus-related information provided by at least one terminal device 300, which includes at least one item among information of a wireless access node of a network which the terminal device 300 is accessing and information of a wireless access node of a neighboring network.

As a result, for each terminal device 300, the policy providing apparatus 400 can manage the apparatus-related information, which includes at least one item among information (for example, base station ID, location information, etc. of a base station apparatus of a WCDMA network 1) of a wireless access node of a network which the terminal device 300 is currently accessing and information (for example, an AP ID, location information, etc. of an AP of a WLAN 3) of a wireless access node of a neighboring network.

The device control unit 430 recognizes the service status information of the data service used by the terminal device 300 which accesses one network among the two or more networks 10 and uses the data service through the network.

According to the second embodiment of the present invention, the service status information includes type information of an application executed in the terminal device 300.

The policy providing apparatus 400 recognizes a type of an application executed in the terminal device 300, generates a network change policy according to the recognized type of the application, and then provides the generated network change policy to the terminal device 300.

In more detail, based on a result of a determination of determining a type of an application executed in the terminal device 300 provided by a particular detection device 500 or a result of the determination on the application types, which is provided by the terminal device 300, the policy providing apparatus 400 recognizes the type information of the application executed in the terminal device 300.

In other words, based on a result of a determination provided by a particular detection device 500 as shown in FIG. 2, which determines a type of an application executed in each terminal device 300, the policy providing apparatus 400 may recognize the type information of an application executed in the terminal device 300.

Also, based on a result of the determination on the application types, which is provided by each terminal device 300, the policy providing apparatus 400 may recognize the type information of an application executed in the terminal device 300.

When the type of the application executed in the terminal device 300 has been recognized based on the determination result provided by the detection device 500 or each terminal device 300, the device control unit 430 generates a network change policy according to the recognized application type based on application-based policy configuration, and provides the generated network change policy to the terminal device 300.

In this event, the recognized type of the application may include various types, which includes, for example, large capacity traffic exceeding a standard value, real time streaming traffic, and bidirectional communication traffic, according to the type information set when the application-based policy configuration is stored.

Therefore, the application-based policy configuration corresponds to information pre-established to enable an network change into an optimum network among networks, such as a WCDMA network 1, a CDMA network 2, a WLAN 3 (for example, a WiFi network), a WiBro network 4, and an LTE network 5 included in the two or more networks 10, in accordance with each or various combinations of the application types including large capacity traffic exceeding a standard value, real time streaming traffic, and bidirectional communication traffic.

Now, described will be an example in which, for the terminal device 300 which accesses the WCDMA network 1 and uses a data service through the WCDMA network 1, the device control unit 430 recognizes a type of an application executed in the terminal device 300 and then determines that the terminal device 300 is executing an application of a large capacity traffic (for example, a VoD service). In this example, the device control unit 430 may determine an optimum network (for example, a WLAN 3) corresponding to the application of the recognized large capacity traffic based on the application-based policy configuration, and generate/determine a network change policy for inducing the terminal device 300 to change its access network.

Further, the device control unit 430 may provide the generated network change policy to the recognized at least one terminal device 300.

Based on the network change policy received from the policy providing apparatus 400, when it is possible to access a particular network (for example, a WLAN 3) which is a target of a network change, the terminal device 300 may change the access network from the current WCDMA network 1 to the WLAN 3.

Figure 8:
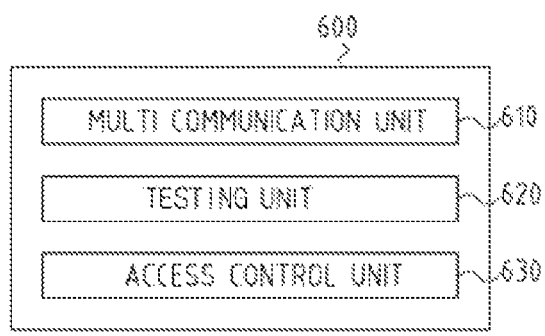
FIG. 8 is a block diagram illustrating a policy providing apparatus according to the third exemplary embodiment of the present invention.

Hereinafter, a construction of the terminal device 600 according to the third embodiment of the present invention as described above will be described with reference to FIG. 8.

The terminal device 600 according to the third embodiment of the present invention includes: a multi communication unit 610 supporting a communication for two or more networks 10; and an access control unit 630 for, when a particular network change policy is received, determining whether it is possible to access a particular network required to be accessed based on the network change policy, and trying to access the particular network through the multi communication unit 610 and changing a current access network into the particular network when it is possible to access the particular network.

The multi communication unit 610 corresponds to the multi communication unit 110 according to the first embodiment of the present invention, so a detailed description thereof is omitted here.

The terminal device 600 according to the third embodiment of the present invention may further include a testing unit 620.

The testing unit 620 transmits or receives a particular test packet for detection of performance information corresponding to each of the two or more networks 10 through the two or more networks 10.

That is, the testing unit 620 may transmit or receive a predefined test packet to or from a particular outside apparatus, specifically a performance detection device 800, so as to support generation of performance information for each network by the performance detection device 800.

For example, when a test packet having a predefined particular size is received through each network included in the two or more networks 10 according to a predefined transmission pattern so that a request for a test for generation of performance information from the performance detection device 800 is received, the testing unit 620 may transmit a response to the request, i.e. a test packet, having a predefined particular size and/or according to a predefined transmission pattern, to the performance detection device 800 through each network.

That is, when a request for a test for generation of performance information from the performance detection device 800 is received, the testing unit 620 may transmit a test packet having a predefined particular size to the performance detection device 800 through each network included in the two or more networks 10.

Alternatively, at a particular test time point, the testing unit 620 may transmit a test packet having a predefined particular size to the performance detection device 800 through each network included in the two or more networks 10 according to a predefined transmission pattern.

In this event, the particular test time point may correspond to a time point at which the terminal device 600 accesses a particular network (for example, a WCDMA network 1) within the two or more networks 10 through the multi communication unit 610 and starts to use a data service through the network, time points with a particular detection cycle during the use of the data service, or a time point at which a handover is to be performed due to occurrence of a predefined handover performance situation.

When a network change policy has been received from the policy providing apparatus 700, the access control unit 630 may perform a network change procedure for changing a network accessed by the multi communication unit 610 based on the network change policy received from the policy providing apparatus 700.

The network change procedure performed based on the network change policy by the access control unit 630 corresponds to the operation of the access control unit 130 according to the first embodiment of the present invention, so a detailed description thereof is omitted here.

In this event, the network change policy received from the policy providing apparatus 700 may include heterogeneous network change allowance or limit information, optimum network type information, optimum network selection and change priority information.

Further, the access control unit 630 may provide a result of the access network change according to the network change policy to the policy providing apparatus 700.

Further, when the access control unit 630 does not perform the access network change based on a determination that it is impossible to access another particular network (for example, a WLAN 3) as described above or due to an error occurred during the access network change, the access control unit 630 may provide a corresponding result to the policy providing apparatus 700.

Figure 9:
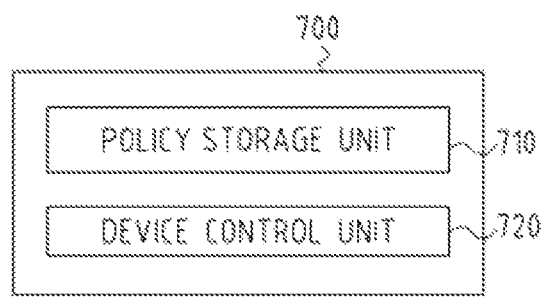
FIG. 9 is a block diagram illustrating a terminal device according to the third exemplary embodiment of the present invention.

Hereinafter, a construction of the policy providing apparatus 700 according to the third embodiment of the present invention as described above will be described with reference to FIG. 9.

The policy providing apparatus 700 according to the third embodiment of the present invention includes an device control unit 720 for recognizing service status information of a data service used by a terminal device 600, which accesses one network among two or more networks 10 and uses the data service through the network, generating a network change policy for inducing an network change into a particular network corresponding to the recognized service status information, and providing the generated network change policy to the terminal device 600.

The policy providing apparatus 700 according to the third embodiment of the present invention may further include a policy storage unit 710.

The storage unit 710 may store application-based policy configuration, which includes various network change policies predefined in order to induce an network change into an optimum network based on network-specific performance information indicating performance information of each network in an environment of the two or more networks 10 and policy determination information based on which a particular network change policy is generated/determined among the various network change policies.

The device control unit 720 recognizes the service status information of the data service used by the terminal device 600 which accesses one network among the two or more networks 10 and uses the data service through the network.

According to the third embodiment of the present invention as described above, the service status information includes network-specific performance information of each of the two or more networks corresponding to the terminal device 600.

Therefore, the device control unit 720 recognizes the network-specific performance information corresponding to the terminal device 600, generates a network change policy for inducing a network change into a particular network based on the recognized network-specific performance information, and then provides the generated network change policy to the terminal device 600.

In more detail, through interworking with the performance detection device 800 which generates performance information of each network according to a result of test packet transmission/reception through each of the two or more networks 10 corresponding to the terminal device 600, the device control unit 720 may acquire network-specific performance information corresponding to the terminal device 600 from the performance detection device 800.

When the device control unit 720 has acquired/recognized the network-specific performance information corresponding to the terminal device 600, the device control unit 720 generates a network change policy according to the recognized network-specific performance information corresponding to the terminal device 600 and then provides the network change policy to the terminal device 600.

For example, let us assume a case in which, as a result of a recognition of network-specific performance information corresponding to the terminal device 600 which is accessing the WCDMA network 1 and using a data service through the WCDMA network 1, a test packet transmission/reception result (for example, at least one of a packet delay rate, a maximum throughput, a minimum throughput, an average throughput, and a packet loss rate) of the WLAN 3 corresponding to the terminal device 600 has the best performance and the performances of the other networks are in an order of the WiBro network 4, the LTE network 5, etc.

In this case, the device control unit 720 may determine an optimum network (for example, a WLAN 3) corresponding to the recognized network-specific performance information corresponding to the terminal device 600, and may generate/determine a network change policy for inducing the terminal device 600 to change an access network.

Then, the device control unit 720 may provide the generated network change policy to the terminal device 600.

Further, the device control unit 720 may acquire network-specific performance information through interworking with a separately configured load state monitoring apparatus (not shown). Alternatively, without interworking with a separately configured load state monitoring apparatus (not shown), the device control unit 720 may acquire network-specific performance information by monitoring load states of wireless access nodes belonging to each of the two or more networks 10 by itself.

As in the example described above, let us assume a case in which, as a result of a recognition of network-specific performance information corresponding to the terminal device 600 which is accessing the WCDMA network 1 and using a data service through the WCDMA network 1, a test packet transmission/reception result (for example, at least one of a packet delay rate, a maximum throughput, a minimum throughput, an average throughput, and a packet loss rate) of the WLAN 3 corresponding to the terminal device 600 has the best performance and the performances of the other networks are in an order of the WiBro network 4, the LTE network 5, etc.

In this case, the device control unit 720 may determine an optimum network (for example, a WLAN 3) by reflecting the recognized network-specific performance information corresponding to the terminal device 600 and network-specific load-related information, generate a network change policy for inducing the terminal device 600 to change an access network, and then provide the network change policy to the terminal device 600.

Then, as described above, based on the network change policy received from the policy providing apparatus 700, when it is possible to access a particular network (for example, a WLAN 3) which is a target of a network change, the terminal device 600 may change the access network from the current WCDMA network 1 to the WLAN 3.

As described above, a system for network change in heterogeneous networks according to the present invention provides a terminal device with a network change policy determined based on a load state of a wireless access node, such as an access point (AP), a type of an application executed in a terminal device, a performance of each network for the terminal device, etc., so as to induce the terminal device to change a network which the terminal device is accessing. Therefore, a system according to the present invention enables a network operator to play a leading role in effectively shifting data traffics and thereby guaranteeing the network stability.

Hereinafter, a method for network change in heterogeneous networks according to exemplary embodiments of the present invention will be described with reference to FIGS. 10 to 18. In the following description, the same reference numerals as those used in FIGS. 1 to 9 are used to designate the same elements for convenience description.

Figure 10:
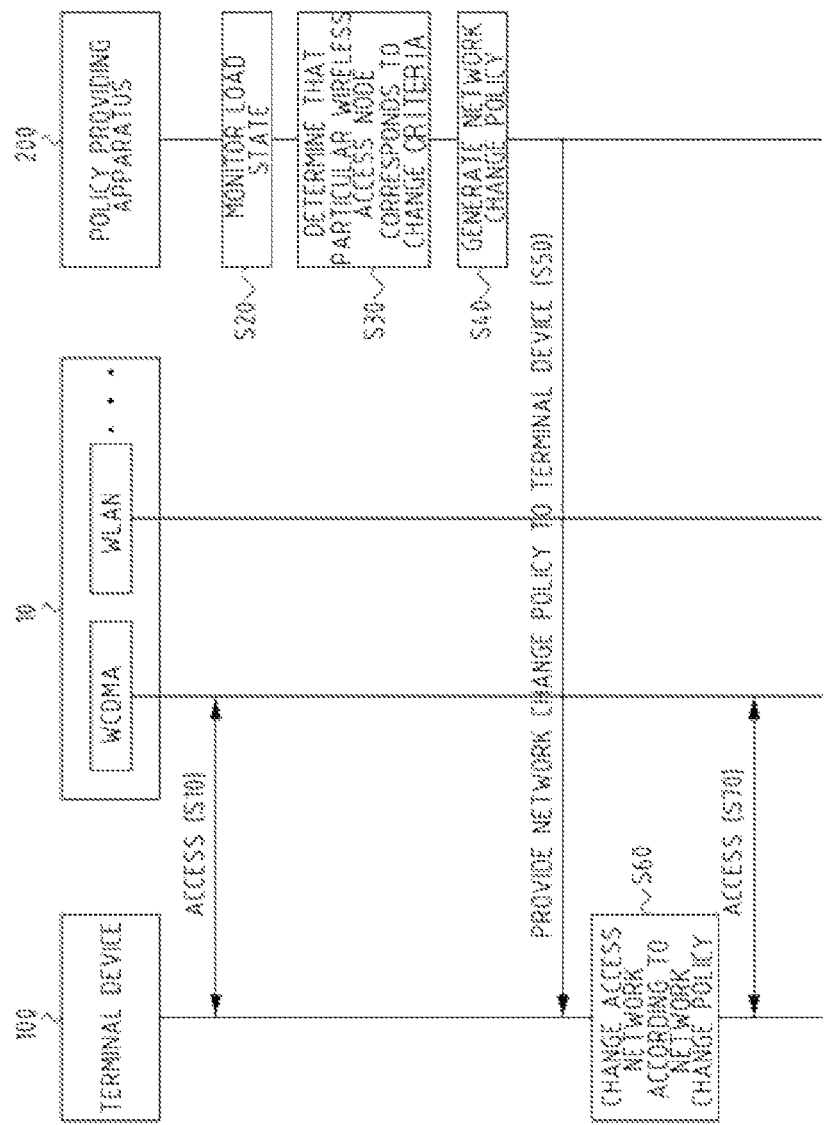
FIG. 10 is a flowchart illustrating a method for network change in heterogeneous networks according to the first exemplary embodiment of the present invention.

First, a method for network change in heterogeneous networks according to the first embodiment of the present invention will be described with reference to FIG. 10.

The terminal device 100 may access one network among two or more networks 10 and use a data service through the network (step S10). For example, the terminal device 100 may use a data service through a wireless access node, i.e. a base station apparatus, of the WCDMA network 1.

The policy providing apparatus 200 monitors load state information of wireless access node indicating a monitored load state of a wireless access node corresponding to each network included in the two or more networks 10 (step S20).

Based on load state information of wireless access node, the policy providing apparatus 200 searches for a wireless access node having load state information corresponding to a particular change criteria (step S30).

When a wireless access node having load state information corresponding to a particular change criteria is found, the policy providing apparatus 200 recognizes at least one terminal device 100 accessing the found wireless access node (for example, a base station apparatus of a WCDMA network 1).

Simultaneously, based on load-based policy configuration predefined in order to induce network change into a particular network based on the load state, the policy providing apparatus 200 generates a network change policy according to the load state information of the found wireless access node (for example, a base station apparatus of a WCDMA network 1) (step S40).

Further, the policy providing apparatus 200 may provide the generated network change policy to the recognized at least one terminal device 100 (step S50).

When the terminal device 100 has received a network change policy from outside, especially from the policy providing apparatus 200, the terminal device 100 changes the access network from the WCDMA network 1 which the terminal device 100 is currently accessing to the WLAN 3 (step S60). As a result, the terminal device 100 is connected to the WLAN 3 according to the network change policy (step S70).

Figure 11:
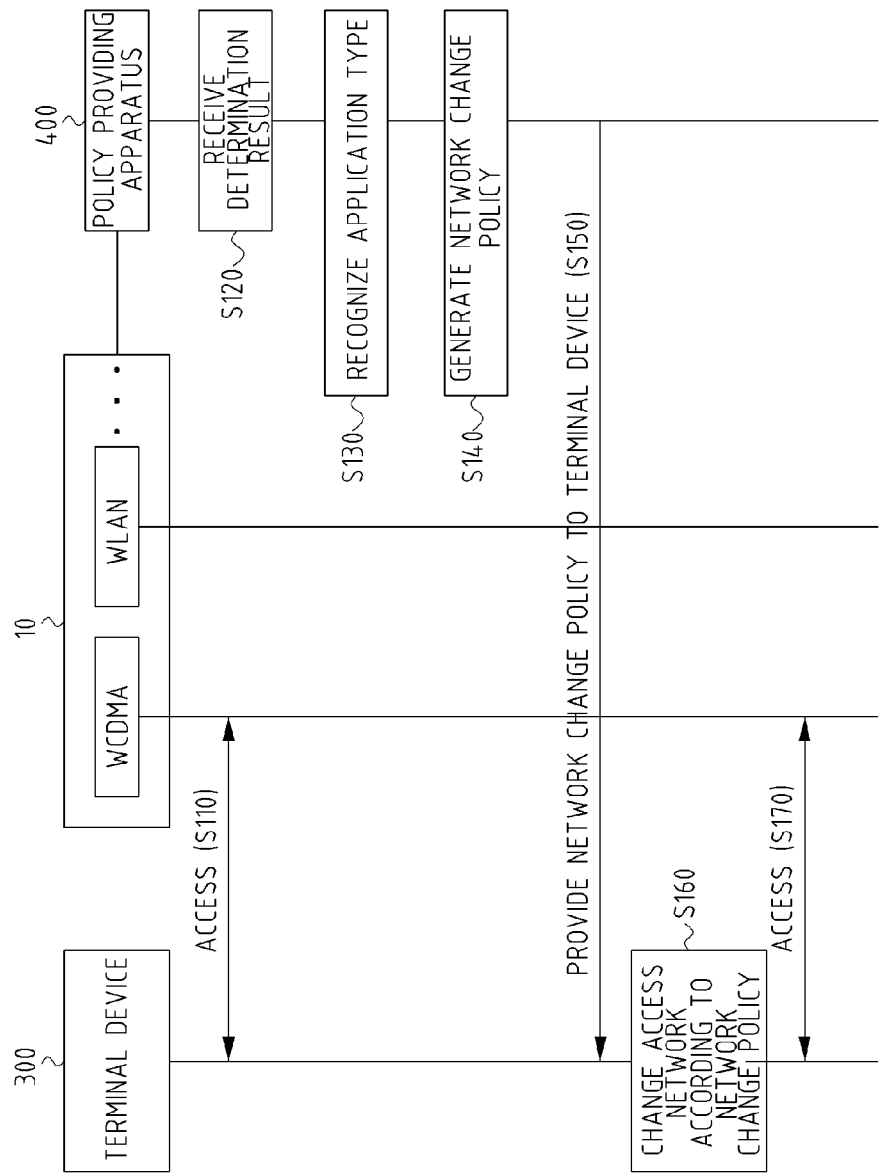
FIG. 11 is a flowchart illustrating a method for network change in heterogeneous networks according to the second exemplary embodiment of the present invention.

Hereinafter, a method for network change in heterogeneous networks according to the second embodiment of the present invention will be described with reference to FIG. 11.

The terminal device 300 may access one network among the two or more networks 10 and use a data service through the network (step S110). For example, the terminal device 300 may use a data service through a wireless access node, i.e. a base station apparatus, of the WCDMA network 1.

The policy providing apparatus 400 monitors a result of determination on a type of an application executed in the terminal device 300 provided by a particular detection device 500 or a result of determination on a type of an application provided by the terminal device 300 (step S120).

Based on the received result of determination, the policy providing apparatus 400 recognizes a type of an application executed in the terminal device 300 (step S130).

Based on application-based policy configuration predefined in order to induce network change into a particular network corresponding to the recognized type of the application, the policy providing apparatus 400 may generate a network change policy according to the recognized type of the application (step S140) and then provide the generated network change policy to the terminal device 300 (step S150).

When the terminal device 300 has received a network change policy from outside, especially from the policy providing apparatus 400, the terminal device 300 changes the access network from the WCDMA network 1 which the terminal device 100 is currently accessing to the WLAN 3 (step S160). As a result, the terminal device 100 is connected to the WLAN 3 according to the network change policy (step S170).

Figure 12:
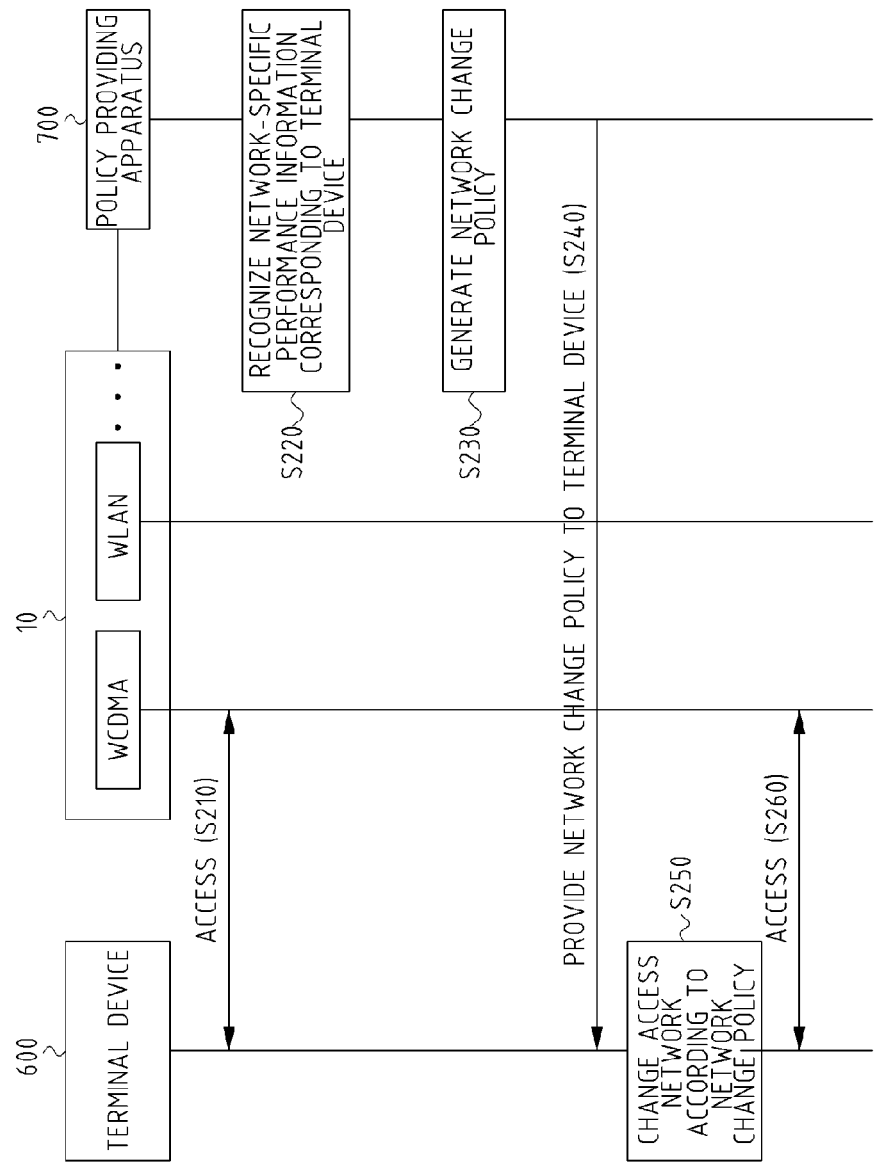
FIG. 12 is a flowchart illustrating a method for network change in heterogeneous networks according to the third exemplary embodiment of the present invention.

Hereinafter, a method for network change in heterogeneous networks according to the third embodiment of the present invention will be described with reference to FIG. 12.

The terminal device 600 may access one network among the two or more networks 10 and use a data service through the network (step S210). For example, the terminal device 600 may use a data service through a wireless access node, i.e. a base station apparatus, of the WCDMA network 1.

The policy providing apparatus 700 recognizes performance information of each network belonging to the two or more networks 10 corresponding to the terminal device 600 (step S220). For example, the terminal device 600 may recognize network-specific performance information corresponding to the terminal device 600 through interworking with the performance detection device 800.

Based on performance-based policy configuration predefined in order to induce network change into a particular network corresponding to the network-specific performance information, the policy providing apparatus 700 generates a network change policy according to the recognized network-specific performance information (step S230) and then provides the generated network change policy to the terminal device 600 (step S240).

When the terminal device 600 has received a network change policy from outside, especially from the policy providing apparatus 700, the terminal device 600 changes the access network from the WCDMA network 1 which the terminal device 100 is currently accessing to the WLAN 3 (step S250). As a result, the terminal device 100 is connected to the WLAN 3 according to the network change policy (step S260).

Figure 13:
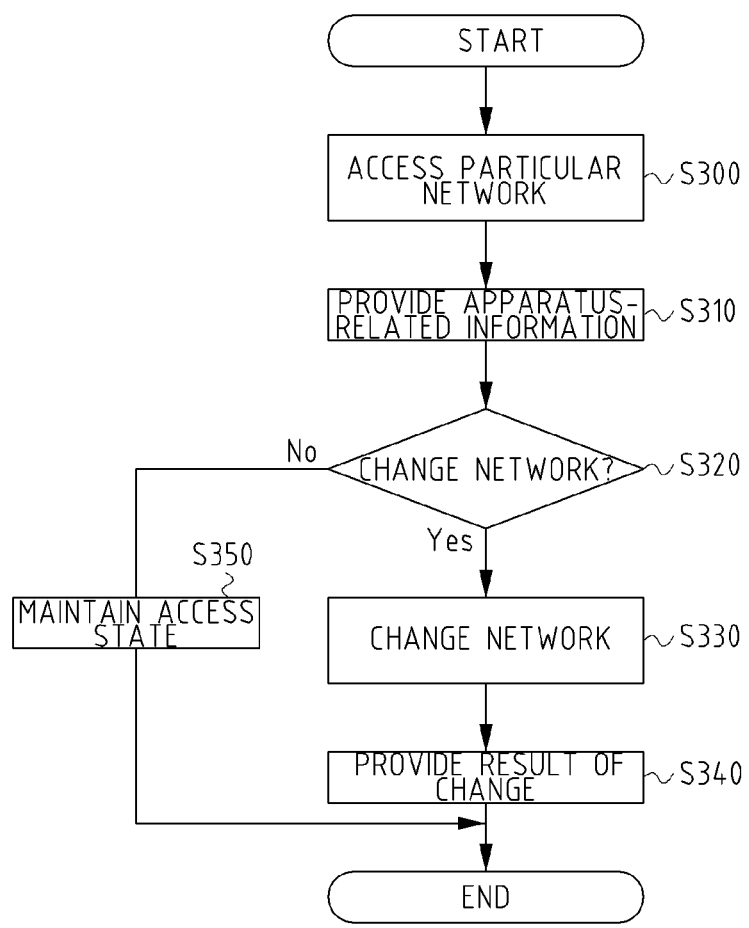
FIG. 13 is a flowchart illustrating an operation method of a policy providing apparatus according to the first exemplary embodiment of the present invention.

Hereinafter, an operation method of a terminal device according to the first embodiment of the present invention will be described with reference to FIG. 13.

In the operation method of a terminal device according to the first embodiment of the present invention, the terminal device may access a base station apparatus of a particular network (for example, a WCDMA network 1) among the two or more networks 10 and then use a data service through the WCDMA network 1 (step S300).

Also, in a state in which the terminal device is accessing the network, the terminal device 100 may provide the policy providing apparatus 200 with apparatus-related information, which includes at least one among information (for example, a base station ID, location information, etc.) of a wireless access node (for example, a base station apparatus of the WCDMA network 1) of the particular network which the terminal device 100 is currently accessing, and information (for example, a base station ID, location information, etc.) of an access point (AP) belonging to the WLAN 3 located adjacent to the terminal device 100 (step S310).

The terminal device determines whether a network change policy is received from the policy providing apparatus 200 (step S320).

When network change policy is not received, the terminal device maintains the current network access to the particular network (step S350).

In contrast, when network change policy is received, the terminal device may perform a network change procedure based on the received network change policy (step S330).

In more detail, the terminal device may determine whether it is possible to access a target network based on the network change policy received from the policy providing apparatus 200, and try to access the target network when it is possible to access the target network.

That is, when a network change policy has been received from the policy providing apparatus 200, the terminal device recognizes a target network (for example, a WLAN 3) which is based on the network change policy received from the policy providing apparatus 200. Further, the terminal device determines whether it is possible to access the target network of the network change, by activating the function for making an access to and providing a communication service to the WLAN 3, i.e. by activating the function of the third communication module as described above.

In this event, the network change policy received from the policy providing apparatus 200 may include heterogeneous network change allowance or limit information, optimum network type information, optimum network selection and change priority information.

Also, when it is determined that it is possible to access the target network (for example, a WLAN 3), the terminal device tries to access the target network (for example, a WLAN 3) and then interrupts the connection with the currently connected network (for example, the WCDMA network 1), so as to complete an access network change procedure according to the received network change policy.

Of course, when it is determined that it is impossible to access the target network (for example, a WLAN 3), the access control unit 130 may not perform the access network change procedure according to the received network change policy.

In this event, the access network change procedure may include all or a part of a conventional handover procedure which changes the access from a currently connected network to another network. Since this access network change procedure corresponds to a typical procedure performed based on a policy in a conventional terminal device supporting a handover in heterogeneous networks.

Further, the terminal device may provide a result of the access network change according to the network change policy to the policy providing apparatus 200 (step S340).

For example, when the terminal device has performed the access network change from a currently connected network (for example, a WCDMA network 1) to another particular network (for example, a WLAN 3) according to the network change policy, the terminal device may provide a corresponding result of the access network change to the policy providing apparatus 200.

Further, when the terminal device does not perform the access network change based on a determination that it is impossible to access another particular network (for example, a WLAN 3) as described above or due to an error occurred during the access network change, the terminal device may provide a corresponding result to the policy providing apparatus 200.

Figure 14:
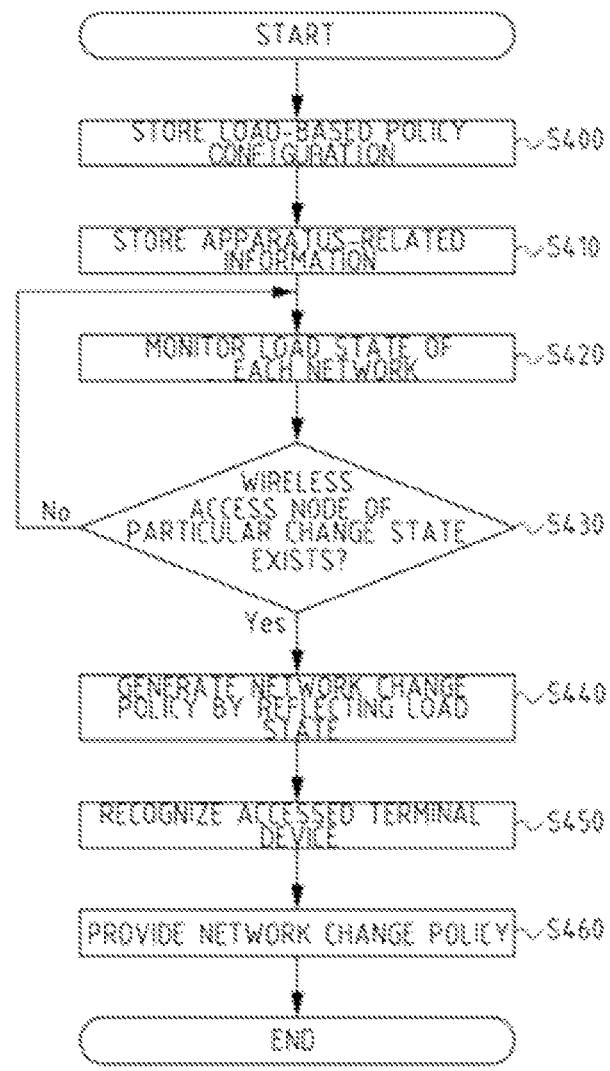
FIG. 14 is a flowchart illustrating an operation method of a terminal device according to the first exemplary embodiment of the present invention.

Hereinafter, an operation method of a policy providing apparatus according to the first embodiment of the present invention will be described with reference to FIG. 14.

In an operation method of a policy providing apparatus according to the first embodiment of the present invention, the policy providing apparatus may store load-based policy configuration, which includes various network change policies predefined in order to induce an network change into an optimum network based on a load state of a network which the terminal device 100 is currently accessing in an environment of the two or more networks 10 and policy determination information based on which a particular network change policy is generated/determined among the various network change policies (step S400).

Further, the policy providing apparatus stores apparatus-related information provided from each terminal device (step S410). That is, the policy providing apparatus stores/manages apparatus-related information provided by at least one terminal device 100, which includes at least one item among information of a wireless access node of a network which the terminal device 100 is accessing, and information of a wireless access node of a neighboring network.

The policy providing apparatus accesses one network among the two or more networks 10 and recognizes service status information according to a data service for the terminal device 100 using the data service.

The service status information includes load state information of a wireless access node corresponding to a network which the terminal device 100 is accessing.

Further, the policy providing apparatus monitors the load state of a wireless access node of each network included in the two or more networks 10. Also, the policy providing apparatus determines whether there is a wireless access node having a load state corresponding to a pre-established change criteria. As a result of the determination, when a load state of a particular wireless access node corresponds to the pre-established change criteria, the policy providing apparatus generates a network change policy corresponding to the load state of the particular wireless access node. Then, the policy providing apparatus provides the network change policy to a terminal device 100 connected to the particular wireless access node.

Specifically, the policy providing apparatus acquires load state information of wireless access node including monitored load states of wireless access nodes corresponding to the two or more networks 10, respectively.

For example, through interworking with a load state monitoring apparatus 290 as shown in FIG. 1, the policy providing apparatus may acquire load state information of wireless access node from the load state monitoring apparatus 290.

Meanwhile, the policy providing apparatus may generate, by itself, load state information of wireless access node including monitored load state information of at least one wireless access node belonging to each network of the two or more networks 10.

As a result, based on load state information of the wireless access node acquired from the load state monitoring apparatus 290 or the load state monitoring unit 230, the policy providing apparatus may monitor the load state of a wireless access node of each network and determine whether there is a wireless access node having a load state corresponding to a pre-established particular change criteria (step S430).

In this event, it is recommendable that the policy providing apparatus has a pre-established change criteria for each network.

For example, the policy providing apparatus may classify the load state of the WCDMA network 1 into states of high, middle, and low and predefine the "high" state as a state requiring the change, and may classify the load state of the WLAN 3 into states of high and low and predefine the "high" state as a state requiring the change.

When a wireless access node having load state information corresponding to the pre-established particular change criteria is found, the policy providing apparatus recognizes at least one terminal device 100 accessing the found wireless access node (for example, a base station apparatus of a WCDMA network 1) (step S450).

When a wireless access node having load state information corresponding to the pre-established particular change criteria is found, the policy providing apparatus recognizes at least one terminal device 100 accessing the found wireless access node (for example, a base station apparatus of a WCDMA network 1) based on the apparatus-related information stored in step S410.

Simultaneously, based on the load-based policy configuration predefined in order to induce network change into a particular network based on a load state, the policy providing apparatus generates a network change policy according to the load state information of the found wireless access node (for example, a base station apparatus of a WCDMA network 1) (step S440).

For example, when the load state of a particular base station apparatus belonging to the WCDMA network 1 corresponds to the pre-established particular change criteria (for example, high state), the policy providing apparatus determines a particular network (for example, a WLAN 3) to be accessed based on a load-based policy configuration reflecting the load state of the particular base station apparatus and generates/determines a network change policy for inducing a terminal device to change its access network.

Further, the policy providing apparatus may provide the generated network change policy to the recognized at least one terminal device 100 (step S460).

Based on the network change policy received from the policy providing apparatus 200, when it is possible to access a particular network (for example, a WLAN 3) which is a target of a network change, the policy providing apparatus may change the access network from the current WCDMA network 1 to the WLAN 3.

Figure 15:
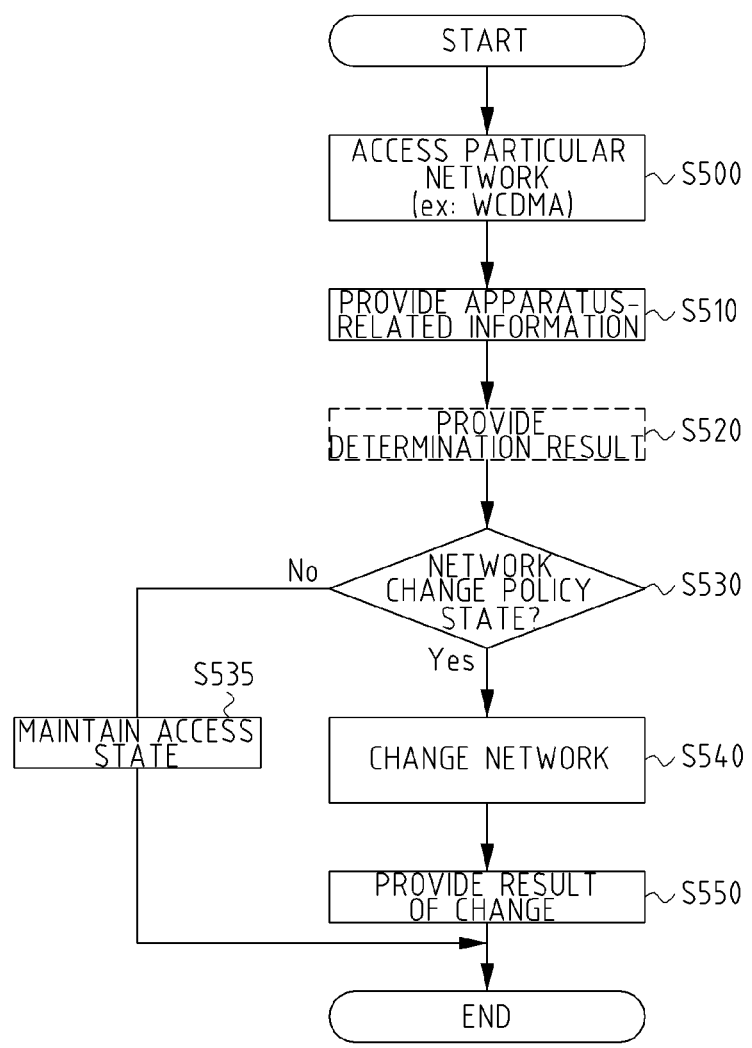
FIG. 15 is a flowchart illustrating an operation method of a policy providing apparatus according to the second exemplary embodiment of the present invention.

Hereinafter, an operation method of a terminal device according to the second embodiment of the present invention will be described with reference to FIG. 15.

In the operation method of a terminal device according to the second embodiment of the present invention, the terminal device may access a base station apparatus of a particular network (for example, a WCDMA network 1) among the two or more networks 10 and then use a data service through the WCDMA network 1 (step S500).

Also, when the terminal device is accessing the network, the terminal device may provide the policy providing apparatus 400 with apparatus-related information, which includes at least one item among information (for example, a base station ID, location information, etc.) of a wireless access node (for example, a base station apparatus of the WCDMA network 1) of a network which the terminal device 300 is currently accessing, and information (for example, a base station ID, location information, etc.) of an access point (AP) belonging to the WLAN 3 located adjacent to the terminal device 300 (step S510).

Further, the terminal device may provide the policy providing apparatus 400 with an application type determination result indicating a type of an application executed in the terminal device (step S520).

That is, at a particular provision time point while the terminal device 300 is accessing a particular network (for example, a WCDMA network 1) among the two or more networks and is using a data service through the particular network, the terminal device may provide an application type determination result indicating the type of an application being executed in the terminal device to the policy providing apparatus 400 when a currently executed application belongs to a list of already stored applications.

Alternatively, at the particular provision time point, the terminal device may analyze data traffic transmitted through the multi communication unit 310 and provide an application type determination result indicating the type of an application being executed to the policy providing apparatus 400 based on a result of the analysis.

The terminal device determines whether a network change policy is received from the policy providing apparatus 400 (step S530).

When network change policy is not received, the terminal device maintains the current network access (step S535).

In contrast, when network change policy is received, the terminal device may perform a network change procedure based on the received network change policy (step S540).

In more detail, the terminal device may determine whether it is possible to access a target network regarding the network change based on the network change policy received from the policy providing apparatus 400, the terminal device may try to access the target network when it is possible to access the target network.

That is, when a network change policy has been received from the policy providing apparatus 400, the terminal device recognizes a particular network (for example, a WLAN 3) which is a target network based on the network change policy received from the policy providing apparatus 400. Further, the terminal device determines whether it is possible to access the target network (for example, a WLAN 3), by activating the function for making an access to and providing a communication service to the WLAN 3, i.e. by activating the function of the third communication module as described above.

In this event, the network change policy received from the policy providing apparatus 400 may include heterogeneous network change allowance or limit information, optimum network type information, optimum network selection and change priority information.

Also, when it is determined that it is possible to access the target network (for example, a WLAN 3), the terminal device tries to access the target network (for example, a WLAN 3) and then interrupts the connection with the currently connected network (for example, the WCDMA network 1), so as to perform an access network change procedure according to the received network change policy.

Of course, when it is determined that it is impossible to access the particular network (for example, a WLAN 3), the access control unit 130 may not perform the access network change procedure according to the received network change policy.

Further, the terminal device may provide a result of the access network change according to the network change policy to the policy providing apparatus 400 (step S550).

For example, when the terminal device has performed the access network change from a currently connected network (for example, a WCDMA network 1) to another particular network (for example, a WLAN 3) according to the network change policy, the terminal device may provide a corresponding result of the access network change to the policy providing apparatus 400.

Further, when the terminal device does not perform the access network change based on a determination that it is impossible to access another particular network (for example, a WLAN 3) as described above or due to an error occurred during the access network change, the terminal device may provide a corresponding result to the policy providing apparatus 400.

Figure 16:
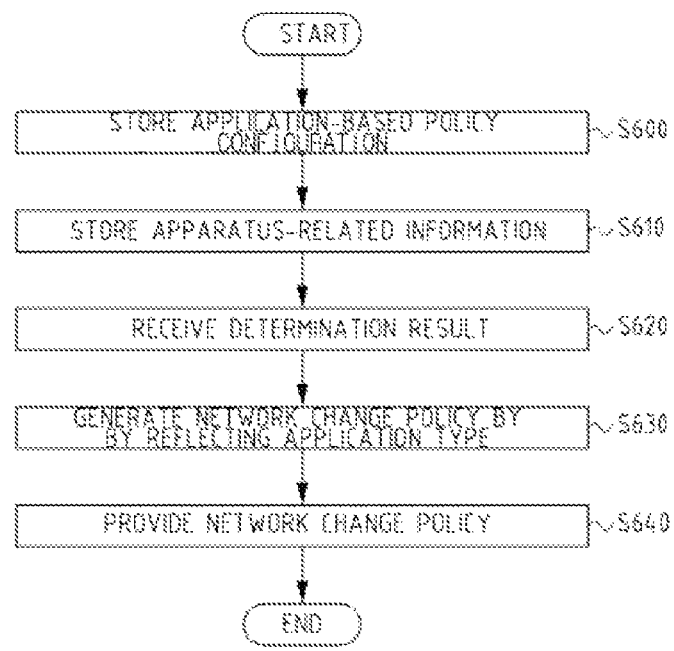
FIG. 16 is a flowchart illustrating an operation method of a terminal device according to the second exemplary embodiment of the present invention.

Hereinafter, an operation method of a policy providing apparatus according to the second embodiment of the present invention will be described with reference to FIG. 16.

In the operation method of a policy providing apparatus according to the second embodiment of the present invention, the policy providing apparatus may store application-based policy configuration, which includes various network change policies predefined in order to induce an network change into an optimum network based on the application type of a currently executed application in an mult-network environment of the two or more networks 10 and policy determination information based on which a particular network change policy is generated/determined among the various network change policies.

Further, the policy providing apparatus stores apparatus-related information provided from each terminal device (step S610).

That is, the policy providing apparatus stores/manages apparatus-related information provided by at least one terminal device 300, which includes at least one item among information of a wireless access node of a network which the terminal device 300 is accessing, and information of a wireless access node of a neighboring network.

The policy providing apparatus accesses one network among the two or more networks 10 and recognizes service status information of a data service for the terminal device 300 using the data service.

The service status information includes type information of an application executed in the terminal device 300.

The policy providing apparatus recognizes a type of an application executed in the terminal device 300, generates a network change policy according to the recognized type of the application, and then provides the generated network change policy to the terminal device 300.

In more detail, the policy providing apparatus receives a result of a determination of a type of an application executed in the terminal device 300 provided by a particular detection device 500 or a result of the determination on the application types, which is provided by the terminal device 300 (step S620).

Based on a result of a determination provided by a particular detection device 500 as shown in FIG. 2, which determines a type of an application executed in each terminal device 300, the policy providing apparatus can recognize the type information of an application executed in the terminal device 300.

In this event, the recognized type of the application may include various types, which includes, for example, large capacity traffic exceeding a standard value, real time streaming traffic, and bidirectional communication traffic, according to the type information set when the application-based policy configuration is stored.

Therefore, the application-based policy configuration corresponds to information pre-established to enable an network change into an optimum network among networks, such as a WCDMA network 1, a CDMA network 2, a WLAN 3 (for example, a WiFi network), a WiBro network 4, and an LTE network 5 included in the two or more networks 10, in accordance with each or various combinations of the application types including large capacity traffic exceeding a standard value, real time streaming traffic, and bidirectional communication traffic.

Therefore, the policy providing apparatus generates a network change policy according to the recognized application type based on application-based policy configuration (step S630), and provides the generated network change policy to the terminal device 300 (step S640).

Now, described will be an example in which, for the terminal device 300 which accesses the WCDMA network 1 and uses a data service through the WCDMA network 1, the device control unit 430 recognizes a type of an application executed in the terminal device 300 and then determines that the terminal device 300 is executing an application of a large capacity traffic (for example, a VoD service).

In this example, the policy providing apparatus may determine an optimum network (for example, a WLAN 3) corresponding to the application of the recognized large capacity traffic based on the application-based policy configuration, and generate/determine a network change policy for inducing the terminal device 300 to change its access network.

Further, the policy providing apparatus may provide the generated network change policy to the terminal device 300.

Based on the network change policy received from the policy providing apparatus 400, when it is possible to access a particular network (for example, a WLAN 3) which is a target of a network change, the terminal device 300 may change the access network from the current WCDMA network 1 to the WLAN 3.

Figure 17:
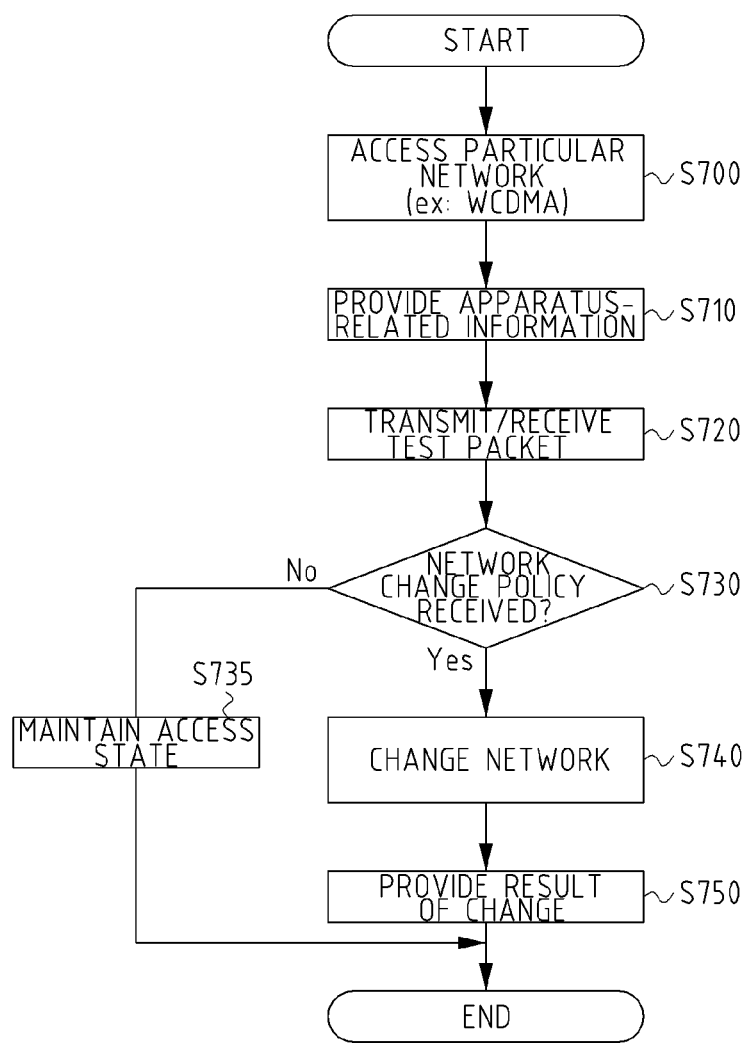
FIG. 17 is a flowchart illustrating an operation method of a policy providing apparatus according to the third exemplary embodiment of the present invention.

Hereinafter, an operation method of a terminal device according to the third embodiment of the present invention will be described with reference to FIG. 17.

In the operation method of a terminal device according to the third embodiment of the present invention, the terminal device may access a base station apparatus of a particular network (for example, a WCDMA network 1) among the two or more networks 10 and then use a data service through the WCDMA network 1 (step S700).

Also, in a state in which the terminal device is accessing the network, the terminal device may provide the policy providing apparatus 700 with apparatus-related information, which includes at least one item among information (for example, a base station ID, location information, etc.) of a wireless access node (for example, a base station apparatus of the WCDMA network 1) of a network which the terminal device 600 is currently accessing, and information (for example, a base station ID, location information, etc.) of an access point (AP) belonging to the WLAN 3 located adjacent to the terminal device 600 (step S710).

Further, the terminal device transmits or receives a particular test packet for detection of performance information corresponding to each of the two or more networks 10 through the two or more networks 10 (step S720).

That is, the terminal device may transmit or receive a predefined test packet to or from a particular outside apparatus, specifically a performance detection device 800, so as to support generation of performance information for each network by the performance detection device 800.

For example, when a request for a test for generating performance information from the performance detection device 800 is received, the terminal device may transmit a response to the request, i.e. a test packet, having a predefined particular size and/or according to a predefined transmission pattern, to the performance detection device 800 through each network.

That is, when a request for a test for generating performance information from the performance detection device 800 is received, the terminal device may transmit a test packet having a predefined particular size to the performance detection device 800 through each network of the two or more networks 10.

Alternatively, at a particular test time point, the terminal device may transmit a test packet having a predefined particular size to the performance detection device 800 through each network of the two or more networks 10 according to a predefined transmission pattern.

In this event, the particular test time point may correspond to a time point at which the terminal device 600 accesses a particular network (for example, a WCDMA network 1) within the two or more networks 10 through the multi communication unit 610 and starts to use a data service through the network, time points with a particular detection cycle during the use of the data service, or a time point at which a handover is to be performed due to occurrence of a predefined handover performance situation.

The terminal device determines whether a network change policy is received from the policy providing apparatus 700 (step S730).

When network change policy is not received, the terminal device maintains the current network access (step S735).

In contrast, when network change policy is received, the terminal device may perform a network change procedure based on the received network change policy (step S740).

In more detail, the terminal device may determine whether it is possible to access a particular network which is a target network of the network change based on the network change policy received from the policy providing apparatus 700, the terminal device may try to access the target network when it is possible to access the target network.

That is, when a network change policy has been received from the policy providing apparatus 700, the terminal device recognizes a particular network (for example, a WLAN 3) which is a target network of the network change based on the network change policy received from the policy providing apparatus 700. Further, the terminal device determines whether it is possible to access the target network (for example, a WLAN 3) by activating the function for making an access to and providing a communication service to the WLAN 3, i.e. by activating the function of the third communication module as described above.

In this event, the network change policy received from the policy providing apparatus 700 may include heterogeneous network change allowance or limit information, optimum network type information, optimum network selection and change priority information.

Also, in the operation method of a terminal device according to the third embodiment of the present invention, when it is determined that it is possible to access the target network (for example, a WLAN 3), the terminal device tries to access the target network (for example, a WLAN 3) and then interrupts the connection with the currently connected network (for example, the WCDMA network 1), so as to perform an access network change procedure according to the received network change policy.

Of course, when it is determined that it is impossible to access the target network (for example, a WLAN 3), the access control unit 130 may not perform the access network change procedure according to the received network change policy.

Further, the terminal device may provide a result of the access network change according to the network change policy to the policy providing apparatus 700 (step S750).

For example, when the terminal device has performed the access network change from a currently connected network (for example, a WCDMA network 1) to another target network (for example, a WLAN 3) according to the network change policy, the terminal device may provide a corresponding result of the access network change to the policy providing apparatus 700.

Further, when the terminal device does not perform the access network change based on a determination that it is impossible to access the target network (for example, a WLAN 3) as described above or due to an error occurred during the access network change, the terminal device may provide a corresponding result to the policy providing apparatus 700.

Figure 18:
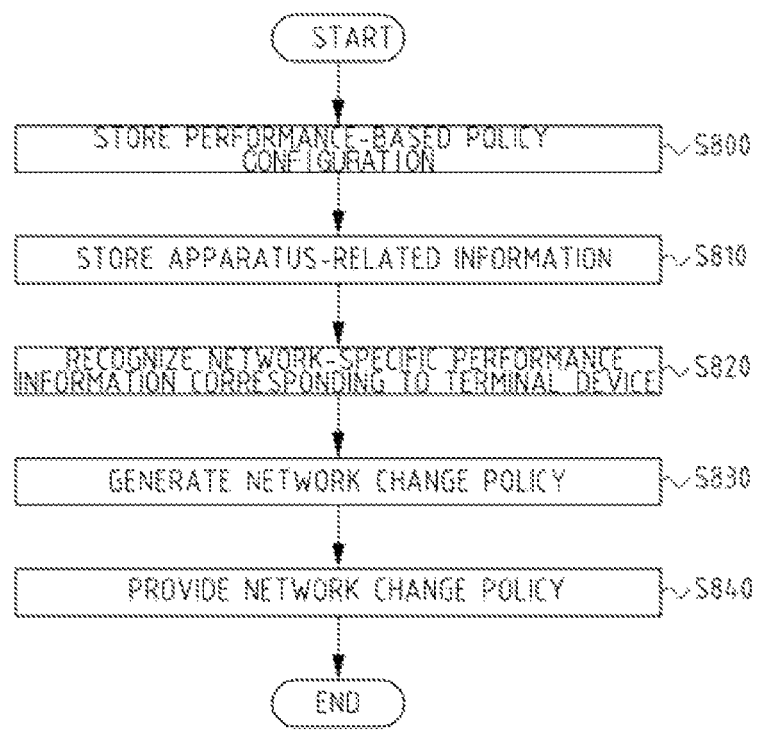
FIG. 18 is a flowchart illustrating an operation method of a terminal device according to the third exemplary embodiment of the present invention.

Hereinafter, an operation method of a policy providing apparatus according to the third embodiment of the present invention will be described with reference to FIG. 18.

In the operation method of a policy providing apparatus according to the third embodiment of the present invention, the policy providing apparatus may store application-based policy configuration, which includes various network change policies predefined in order to induce an network change into an optimum network based on the application type of a currently executed application in an environment of the two or more networks 10 and policy determination information based on which a particular network change policy is generated/determined among the various network change policies.

Further, the policy providing apparatus stores apparatus-related information provided from each terminal device (step S810).

That is, the policy providing apparatus stores/manages apparatus-related information provided by at least one terminal device 600, which includes at least one item among information of a wireless access node of a network which the terminal device 600 is accessing, and information of a wireless access node of a neighboring network.

The policy providing apparatus recognizes the service status information of the data service used by the terminal device 600 which accesses one network among the two or more networks 10 and uses the data service through the network.

According to the embodiment of the present invention as described above, the service status information includes network-specific performance information of each of the two or more networks corresponding to the terminal device 600.

Therefore, the policy providing apparatus recognizes the network-specific performance information corresponding to the terminal device 600, generates a network change policy for inducing an network change into a particular network based on the recognized network-specific performance information, and then provides the generated network change policy to the terminal device 600.

In more detail, through interworking with the performance detection device 800 which generates performance information of each network according to a result of test packet transmission/reception through each of the two or more networks 10, the policy providing apparatus may acquire and recognize network-specific performance information corresponding to the terminal device 600 from the performance detection device 800 (step 820).

When the policy providing apparatus has acquired/recognized the network-specific performance information corresponding to the terminal device 600, the policy providing apparatus generates a network change policy according to the recognized network-specific performance information corresponding to the terminal device 600 (step 830).

Then, the policy providing apparatus provides the network change policy to the terminal device 600 (step 840).

For example, assuming a case in which, as a result of a recognition of network-specific performance information corresponding to the terminal device 600 which is now accessing the WCDMA network 1 and using a data service through the WCDMA network 1, a test packet transmission/reception result (for example, at least one of a packet delay rate, a maximum throughput, a minimum throughput, an average throughput, and a packet loss rate) of the WLAN 3 corresponding to the terminal device 600 has the best performance and the performances of the other networks are in an order of the WiBro network 4, the LTE network 5, etc.

In this case, the policy providing apparatus may determine an optimum network (for example, a WLAN 3) based on the recognized network-specific performance information corresponding to the terminal device 600, and may generate/determine a network change policy for inducing the terminal device 600 to change an access network.

Further, the policy providing apparatus may provide the generated network change policy to the terminal device 600.

Based on the network change policy received from the policy providing apparatus 700, when it is possible to access a particular network (for example, a WLAN 3) which is a target of a network change, the terminal device 600 may change the access network from the current WCDMA network 1 to the WLAN 3.

As described above, a system for network change in heterogeneous networks according to the present invention provides a terminal device with a network change policy determined based on a load state of a wireless access node, such as an access point (AP), a type of an application executed in a terminal device, a performance of each network for the terminal device, etc., so as to induce the terminal device to change a network which the terminal device is accessing. Therefore, a system according to the present invention enables a network operator to play a leading role in effectively shifting data traffics and thereby guaranteeing the network stability.

Meanwhile, the steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of storage medium (e.g. a computer-readable storage medium) known in the art. A sample storage medium may be coupled to a machine such as, for example, a computer/processor (which may be referred to herein, for convenience, as a "processor") such that the processor can read information (e.g., software commands) from and write information to the storage medium. A sample storage medium may be integral to the processor. The processor and the storage medium may reside in an ASIC. The ASIC may reside in user equipment. In the alternative, the processor and the storage medium may reside as discrete components in user equipment.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

INDUSTRIAL APPLICABILITY

A system for network change in heterogeneous networks according to the present invention provides a terminal device with a network change policy determined based on a load state of a wireless access node, a type of an application executed in a terminal device, a performance of each network for the terminal device, etc., so as to induce the terminal device to change a network which the terminal device is accessing. Therefore, a system according to the present invention enables a network operator to play a leading role in effectively shifting data traffics and thereby guaranteeing the network stability. In view of these effects, the present invention has overcome and exceeded the limit of the conventional technology and thus has a sufficient marketability or possibility of sale of not only the pertinent technology but also applied products. Moreover, the present invention has been disclosed clearly enough to carry out the present invention by one skilled in the art. Therefore, the present invention has an industrial applicability.

What is claimed is:

1. A policy providing apparatus comprising:
    a device control unit configured to
        recognize service status information of a data service which is used by a terminal device through one network among two or more networks,
        generate a network change policy for changing the one network accessed by the terminal device based on the service status information, and
        provide the terminal device with the network change policy;
    a terminal device, comprising:
        a multi communication unit configured to support two or more networks and an access control unit configured to
        when the network change policy is received, determine whether it is possible to access a particular network required to be accessed based on the network change policy, and
        when it is determined to be possible to access the particular network, access the particular network through the multi communication unit and change a thereby current access network of the terminal device to the particular network; and
        wherein the terminal device further comprises a testing unit configured to transmit or receive a test packet through the two or more networks for detecting performance information of each of the two or more networks.

2. The policy providing apparatus as claimed in claim 1, wherein the service status information comprises at least one selected from the group consisting of
    load state information of a wireless access node corresponding to the one network accessed by the terminal device, type information of an application executed in the terminal device, and network-specific performance information for each of the two or more networks.

3. The policy providing apparatus as claimed in claim 2, wherein the device control unit is further configured to acquire load state information of a wireless access node corresponding to each of the two or more networks, determine a wireless access node having load state information corresponding to a particular change criterion based on the load state information of the wireless access node corresponding to each of the two or more networks, and recognize at least one terminal device accessing the determined wireless access node.

4. The policy providing apparatus as claimed in claim 3, wherein the device control unit is further configured to generate the network change policy based on the load state information of the determined wireless access node, and provide the network change policy to the at least one terminal device.

5. The policy providing apparatus as claimed in claim 2, wherein the device control unit is further configured to recognize the type information of the application executed in the terminal device, and the type information of the application is detected by the terminal device or a detection device for detecting the type information of the application.

6. The policy providing apparatus as claimed in claim 5, wherein the device control unit is further configured to generate the network change policy based on the recognized type information of the application, and provide the network change policy to the terminal device.

7. The policy providing apparatus as claimed in claim 2, wherein the device control unit is further configured to recognize network-specific performance information with respect to the terminal device, and the network-specific performance information is detected by a performance detection device based on transmission or reception of a test packet through each of the two or more networks with respect to the terminal device.

8. The policy providing apparatus as claimed in claim 7, wherein the device control unit is further configured to generate the network change policy based on the recognized network-specific performance information, and provide the network change policy to the terminal device.

9. A system for network change, the system comprising:

a policy providing apparatus comprising:

a device control unit configured to recognize service status information of a data service which is used by a terminal device through one network among two or more networks, generate a network change policy for changing the one network accessed by the terminal device based on the service status information, and provide the terminal device with the network change policy; and a terminal device, comprising, a multi communication unit configured to support two or more networks, and an access control unit configured to when the network change policy is received, determine whether it is possible to access a particular network required to be accessed based on the network change policy, and when it is determined to be possible to access the particular network, access the particular network through the multi communication unit and change a current access network of the terminal device to the particular network, and wherein the terminal device further comprises a testing unit configured to transmit or receive a test packet through the two or more networks for detecting performance information of each of the two or more networks.

10. An operation method of a policy providing apparatus, the method comprising:

accessing, by a terminal device, one network among two or more networks:

recognizing, by the policy providing apparatus, service status information of a data service which is used by a terminal device through one network among two or more networks;

generating, by the policy providing apparatus, a network change policy for changing the one network accessed by the terminal device based on the service status information; and providing, by the policy providing apparatus, the terminal device with the network change policy;

determining by the terminal device when the network policy is received, whether it is possible to access a s particular network required to be accessed based on the network change policy;

when it is determined to be possible to access the particular network, accessing, by the terminal device, the particular network, and changing, by the terminal device, a current access network of the terminal device to the particular network; and transmitting or receiving, by the terminal device, a test packet through the two or more networks for detecting performance information of each of the two or more networks.

11. The operation method as claimed in claim 10, wherein the service status information comprises at least one selected from the group consisting of load state information of a wireless access node corresponding to the one network accessed by the terminal device, type information of an application executed in the terminal device, and network-specific performance information for each of the two or more networks.

12. The operation method as claimed in claim 11, wherein the recognizing comprises:

acquiring load state information of a wireless access node corresponding to each of the two or more networks;

determining a wireless access node having load state information corresponding to a particular change criterion based on the load state information of the wireless access node corresponding to each of the two or more networks; and recognizing at least one terminal device accessing the determined wireless access node.

13. The operation method as claimed in claim 12, wherein the providing comprises:

generating the network change policy based on the load state information of the determined wireless access node; and providing the network change policy to the at least one terminal device.

14. The operation method as claimed in claim 11, wherein the recognizing comprises:

recognizing the type information of the application executed in the terminal device, wherein the type information of the application is detected by the terminal device or a detection device for detecting the type information of the application.

15. The operation method as claimed in claim 14, wherein the providing comprises:

generating the network change policy based on the recognized type information of the application; and providing the network change policy to the terminal device.

16. The operation method as claimed in claim 11, wherein the recognizing comprises:

recognizing network-specific performance information with respect to the terminal device, wherein the network-specific performance information is detected by a performance detection device based on transmission or reception of a test packet through each of the two or more networks with respect to the terminal device.

17. The operation method as claimed in claim 16, wherein the providing comprises:

generating the network change policy based on the recognized type information of the application; and providing the network change policy to the terminal device.

\* \* \* \* \*